US 9,597,641 B2

(12) United States Patent
Kwon et al.

(10) Patent No.: US 9,597,641 B2
(45) Date of Patent: Mar. 21, 2017

(54) SEMI-PERMEABLE MEMBRANES AND PRODUCTION METHODS THEREOF

(71) Applicant: Samsung Electronics Co., Ltd., Suwon-Si, Gyeonggi-Do (KR)

(72) Inventors: Bok Soon Kwon, Seoul (KR); Sung Soo Han, Hwaseong-si (KR); No Won Kim, Busan-si (KR); Bo Ram Jung, Busan-si (KR)

(73) Assignees: Samsung Electronics Co., Ltd., Gyeonggi-Do (KR); Dong-Eui University Industry-Academic Cooperation Foundation, Busan (KR)

( * ) Notice: Subject to any disclaimer, the term of this patent is extended or adjusted under 35 U.S.C. 154(b) by 0 days.

(21) Appl. No.: 14/548,765

(22) Filed: Nov. 20, 2014

(65) Prior Publication Data

US 2015/0157989 A1    Jun. 11, 2015

(30) Foreign Application Priority Data

Dec. 6, 2013    (KR) .......................... 10-2013-0151799

(51) Int. Cl.
  *B01D 69/10* (2006.01)
  *B01D 71/06* (2006.01)
  (Continued)

(52) U.S. Cl.
  CPC .......... *B01D 69/10* (2013.01); *B01D 67/0079* (2013.01); *B01D 67/0088* (2013.01);
  (Continued)

(58) Field of Classification Search
  CPC .......... C02F 1/441; C02F 1/445; B01D 69/10; B01D 71/56; B01D 67/0079; B01D 69/141;
  (Continued)

(56) References Cited

U.S. PATENT DOCUMENTS 4,503,145 A * 3/1985 Katsuyama .............. C12Q 1/26
                                                         422/421
4,534,775 A * 8/1985 Frazier .................... B01D 53/00
                                                         422/122

(Continued)

FOREIGN PATENT DOCUMENTS

KR      2009-0099633 A     9/2009
KR   10-2012-0083695 A     7/2012

(Continued)

OTHER PUBLICATIONS

Nunes,"Membranes of poly(ether imide) and nanodispersed silica", Journal of Membrane Science,1999, 8pgs, vol. 157 No. 2, Germany.

(Continued)

*Primary Examiner* — Brian R Gordon
(74) *Attorney, Agent, or Firm* — Harness, Dickey & Pierce, P.L.C.

(57) ABSTRACT

A semi-permeable membrane may include a support layer and an active layer in contact with the support layer. The support layer includes a porous structure including a polymer and at least one metal (or metalloid) oxide in the porous structure. In the support layer, the amount of the metal (or metalloid) oxide present in a portion adjacent to the active layer is higher than the amount of the metal (or metalloid) oxide present in a portion farther from the active layer.

17 Claims, 28 Drawing Sheets

(51) Int. Cl.
*B01D 67/00* (2006.01)
*B01D 69/12* (2006.01)
*B01D 69/14* (2006.01)
*B01D 71/56* (2006.01)
*C02F 1/44* (2006.01)
*B01D 71/02* (2006.01)

(52) U.S. Cl.
CPC ......... *B01D 69/105* (2013.01); *B01D 69/125* (2013.01); *B01D 69/141* (2013.01); *B01D 71/06* (2013.01); *B01D 71/56* (2013.01); *C02F 1/441* (2013.01); *C02F 1/445* (2013.01); *B01D 71/024* (2013.01); *B01D 71/025* (2013.01); *B01D 71/027* (2013.01); *B01D 2323/00* (2013.01); *B01D 2325/00* (2013.01)

(58) Field of Classification Search
CPC .... B01D 69/144; B01D 71/06; B01D 71/024; B01D 71/025; B01D 71/027
See application file for complete search history.

(56) References Cited

U.S. PATENT DOCUMENTS

| | | | |
|---|---|---|---|
| 4,551,156 A | 11/1985 | Li | |
| 6,332,964 B1* | 12/2001 | Chen | B01D 61/30 204/295 |
| 6,537,496 B1* | 3/2003 | Knappe | G01N 33/525 422/401 |
| 6,943,123 B2 | 9/2005 | Ruldolph et al. | |
| 7,553,450 B2* | 6/2009 | Attar | G01N 21/81 116/200 |
| 7,862,648 B2 | 1/2011 | Oyama et al. | |
| 8,695,811 B2 | 4/2014 | Kang et al. | |
| 2006/0127656 A1* | 6/2006 | Gallo | B01D 53/228 428/212 |
| 2008/0210087 A1* | 9/2008 | Ku | B01D 53/228 95/51 |
| 2011/0042315 A1* | 2/2011 | Parnas | B01D 61/362 210/640 |
| 2011/0210062 A1 | 9/2011 | Wang et al. | |
| 2012/0181228 A1 | 7/2012 | Kang et al. | |
| 2012/0261321 A1 | 10/2012 | Han et al. | |
| 2012/0261344 A1 | 10/2012 | Kurth et al. | |
| 2012/0267304 A1 | 10/2012 | Han et al. | |
| 2013/0020243 A1 | 1/2013 | Han et al. | |
| 2013/0029843 A1 | 1/2013 | Edmiston et al. | |
| 2013/0134081 A1 | 5/2013 | Kang et al. | |
| 2013/0313182 A1 | 11/2013 | Kang et al. | |
| 2014/0158612 A1 | 6/2014 | Kong et al. | |
| 2014/0326657 A1 | 11/2014 | Kang et al. | |

FOREIGN PATENT DOCUMENTS

| | | |
|---|---|---|
| KR | 10-2012-0118408 A | 10/2012 |
| KR | 10-2012-0119043 A | 10/2012 |
| KR | 10-2013-0011987 A | 1/2013 |
| KR | 1020130049616 A | 5/2013 |
| KR | 10-2013-0059869 A | 6/2013 |
| KR | 10-2013-0131758 A | 12/2013 |
| KR | 2014-0131810 A | 11/2014 |

OTHER PUBLICATIONS

Suvorova,"Hydrophilic nature and sorption diffusionproperties of nanocomposite hybrid polysulfone films", Russian Chemical Bulletin, Mar. 2012, 8pgs, International Edition, vol. 61, No. 3, Russian Federation.
Jadav, "Synthesis of novel silica-polyamide nanocomposite membrane with enhanced properties", Journal of Membrane Science 328 (2009), 11pgs, India.
Cazacu, "Organic-Inorganic Polymer Hybrids and Porous Materials Obtained on Their Basis", Journal of Applied Polymer Science, 2002, 8pgs, vol. 88, Romania.
European Search Report mailed on Apr. 8, 2015.

* cited by examiner

SEMI-PERMEABLE MEMBRANES AND PRODUCTION METHODS THEREOF

CROSS-REFERENCE TO RELATED APPLICATION

This application claims priority under 35 U.S.C. §119 to Korean Patent Application No. 10-2013-0151799, filed in the Korean Intellectual Property Office on Dec. 6, 2013, the entire contents of which are incorporated herein by reference.

BACKGROUND

1. Field

The present disclosure relates to semi-permeable membranes, production methods thereof, and water treatment devices including the same.

2. Description of the Related Art

Osmosis (or forward osmosis) refers to a phenomenon wherein water moves from a lower solute concentration solution to a solution of a higher solute concentration by osmotic pressure. Reverse osmosis is a method of artificially applying pressure to move water in the opposite direction. The forward and the reverse osmosis methods are commonly used in a water treatment application such as water purification and desalination.

In the reverse osmosis water treatment, a pressure corresponding to the osmotic pressure generated by dissolved substances is applied to separate the dissolved substances from water. To this end, developing a semi-permeable membrane (e.g., a thin film membrane or a thin film composite membrane) having higher water flux and improved performance for excluding salts is desired.

The water reverse osmosis treatment involves artificially applying a relatively high pressure and thus entails relatively high energy consumption. To increase energy efficiency, a forward osmosis process using the principle of osmotic pressure has been suggested. The forward osmosis process uses osmotic pressure that is generated by the difference between the feed solution and a draw solution. Therefore, in order for the forward osmosis process to be used effectively, it is important to develop a semi-permeable membrane that may provide a relatively high osmotic pressure between the feed solution and the draw solution and minimize reverse salt flux of draw solutes while facilitating the flow of water from the feed solution to the draw solution.

SUMMARY

Some example embodiments relate to a semi-permeable membrane that may show a higher flux and improved performance of salt removal.

Some example embodiments relate to production methods of the semi-permeable membrane.

Some example embodiments relate to a water treatment apparatus including the semi-permeable membrane.

According to one example embodiment, a semi-permeable membrane may include a support layer and an active layer being in contact with the support layer. The support layer includes a first surface and an opposing second surface as well as a porous structure including a polymer and at least one metal (or metalloid) oxide in the porous structure. In the support layer, the amount of the metal (or metalloid) oxide in a portion of the support layer that is adjacent to an interface with the active layer is greater than the amount of the metal (or metalloid) oxide in a portion that is farther from the interface with active layer.

The amount of the metal (or metalloid) oxide may have a rising or increasing concentration gradient toward an interface between the support layer and the active layer.

The support layer may have an amount of the metal or the metalloid element of the metal (or metalloid) oxide of greater than or equal to about 5% in a face adjacent to the active layer based on a total weight of all elements in the adjacent face.

The metal (or metalloid) oxide may include silicon, titanium, zirconium, aluminum, or a combination thereof.

The polymer may be selected from a polysulfone, a polyethersulfone, a polyphenylsulfone, a polycarbonate, a polyethylene oxide, a polyimide, a polyetherimide, a polyetherether ketone, a polypropylene, a polymethyl chloride, a polyvinylidene fluoride, acrylonitrile copolymer, cellulose triacetate, cellulose acetate, cellulose ester, a polystyrene, a copolymer thereof, a derivative thereof, and a combination thereof.

The porous structure may include a fiber assembly.

The metal (or metalloid) oxide may include silica, an organosilica having a substituted or unsubstituted aminoalkyl group, an organosilica having a glycidoxy alkyl group, titania ($TiO_2$), zirconia ($ZrO_2$), alumina, zeolite, or a combination thereof.

At least 90% of a total amount of the metal (or metalloid) oxide may be present within 50% of a total thickness of the support layer from the interface between the support layer and the active layer.

The thickness of the support layer may be less than or equal to about 150 μm.

The active layer may include a polymer selected from polyamide, cellulose triacetate, cellulose acetate, cellulose ester, polyimide, polyurethane, polybenzimidazole, a derivative thereof, and a combination thereof.

The active layer may include the same type of a polymer as the support layer.

According to another example embodiment, a semi-permeable membrane may include a support layer and an active layer being in contact with the support layer. The support layer includes a first surface and an opposing second surface as well as a porous structure including a polymer and at least one metal (or metalloid) oxide in the porous structure. In the support layer, an amount of the metal (or metalloid) being present in the first surface adjacent to the active layer may be greater than or equal to about 5 wt % based on a total weight of all elements in the adjacent first surface.

The metal (or metalloid) oxide may include silicon, titanium, zirconium, aluminum, or a combination thereof.

The amount of the metal (or metalloid) element of the metal (or metalloid) oxide being present in a face adjacent to the active layer may be greater than or equal to about 10 wt % based on a total weight of all elements in the adjacent face.

The amount of the metal (or metalloid) element of the metal (or metalloid) oxide being present in a face adjacent to the active layer may be greater than or equal to about 20 wt % based on a total weight of all elements in the adjacent face.

According to another example embodiment, a method of producing a semi-permeable membrane may include obtaining a support layer including a porous structure having a polymer; preparing an active layer that is in contact with the support layer; obtaining a colloidal solution including a solvent and at least one selected from a precursor of a metal (or metalloid) oxide, a hydrolyzed product thereof, and a condensation-polymerization product thereof; and contacting the colloidal solution with the porous structure and drying the same to form a metal (or metalloid) oxide in the porous structure so that, in the support layer, the amount of the metal (or metalloid) oxide present in a portion adjacent to the active layer is greater than the amount of the metal (or metalloid) oxide present in a portion farther from the active layer.

The precursor of the metal (or metalloid) oxide may include a compound represented by Chemical Formula 1-a or Chemical Formula 1-b.

$$(R^1)_x\text{-}A\text{-}(R^2)_{n-x} \quad \text{Chemical Formula 1-a}$$

Herein, A is Si, Ti, Zr, or Al, $R^1$ are the same or different and are each independently hydrogen, a substituted or unsubstituted straight or branched C1 to C10 alkyl group, a substituted or unsubstituted straight or branched C2 to C10 alkenyl group, a substituted or unsubstituted straight or branched C1 to C10 amine group, or a glycidyl ether group, $R^2$ are the same or different and are each independently a hydroxyl group, —Cl, or a straight or branched C1 to C10 alkoxy group, n is 3 or 4, x is 0, 1, or 2, and n–x is greater than or equal to about 2.

$$(R^3)_y(R^4)_{3-y}\text{-}A\text{-}L\text{-}A\text{-}(R^5)_z(R^6)_{3-z} \quad \text{Chemical Formula 1-b}$$

Herein, A is Si or Ti, L is a direct bond, —O—, or a C1 to C10 alkylene group, $R^3$ are the same or different and are each independently hydrogen or a substituted or unsubstituted straight or branched C1 to C10 alkyl group, $R^4$ are the same or different and are each independently a hydroxyl group, —Cl, or a C1 to C10 alkoxy group, $R^5$ are the same or different and are each independently hydrogen, a substituted or unsubstituted straight or branched C1 to C10 alkyl group, $R^6$ are the same or different and are each independently a hydroxyl group, —Cl, or a C1 to C10 alkoxy group, y is 0, 1, or 2, and z is 0, 1, or 2.

The amount of the metal (or metalloid) oxide may have a rising or increasing concentration gradient toward an interface between the support layer and the active layer.

The method may further include preparing a solution including a solvent and at least one selected from a compound represented by Chemical Formula 2, a hydrolyzed product thereof, and a condensation-polymerized product thereof, and contacting the solution with the porous structure including the metal (or metalloid) oxide.

$$(X)_x\text{-}A\text{-}(R^7)_{n-x} \quad \text{[Chemical Formula 2]}$$

Herein, A is Si, Ti, Zr, or Al, $R^7$ are the same or different and are each independently a hydroxyl group, —Cl, or a C1 to C10 alkoxy group, n is 3 or 4, x is 1, 2, or 3, n–x is greater than or equal to 1, X are the same or different and are each independently hydrogen, a substituted or unsubstituted C1 to C10 alkyl, a substituted or unsubstituted C02 to C10 alkenyl, a substituted or unsubstituted C1 to C10 aminoalkyl, or a glycidoxy alkyl group, provided that at least one of X is a substituted or unsubstituted C1 to C10 aminoalkyl or a glycidoxy alkyl group.

The obtaining of a support layer may include contacting the porous structure with a solution including the polymer and a solvent and removing the solvent therefrom by phase transition.

The porous structure may include a fiber assembly.

The preparing of the active layer may be conducted prior to or after the formation of the metal (or metalloid) oxide.

The polymer may be selected from a polysulfone, a polyethersulfone, a polyphenylsulfone, a polycarbonate, a polyethylene oxide, a polyimide, a polyetherimide, a polyetherether ketone, a polypropylene, a polymethyl chloride, a polyvinylidene fluoride, acrylonitrile copolymer, cellulose triacetate, cellulose acetate, cellulose ester, a polystyrene, a copolymer thereof, a derivative thereof, and a combination thereof.

The active layer may include at least one polymer selected from polyamide, cellulose triacetate, cellulose acetate, cellulose ester, polyimide, polyurethane, polybenzimidazole, a derivative thereof, and a combination thereof.

The precursor of the metal (or metalloid) oxide may include tetramethoxysilane, tetraethoxysilane, triethoxyethylsilane, 1,2-bis(triethoxy silyl)ethane, titanium tetraisopropoxide (TTIP), zirconium n-propoxide, aluminum isopropoxide, or a combination thereof.

The compound represented by Chemical Formula 2 may include aminoethyl aminopropyl trimethoxy silane, aminopropyl trimethoxy silane, glycidoxy propyl trimethoxy silane, or a combination thereof.

At least about 90% of a total amount of the metal (or metalloid) oxide may be present within 50% of a total thickness of the support layer from the interface between the support layer and the active layer.

The semi-permeable membrane of the aforementioned example embodiments may exhibit higher water flux and improved salt removal performances so as to be particularly useful in the desalination of sea water or an osmosis process such as forward osmosis or a low-pressure operated reverse osmosis for a feed solution including substances to be separated at a higher concentration.

DETAILED DESCRIPTION

Figure 1:
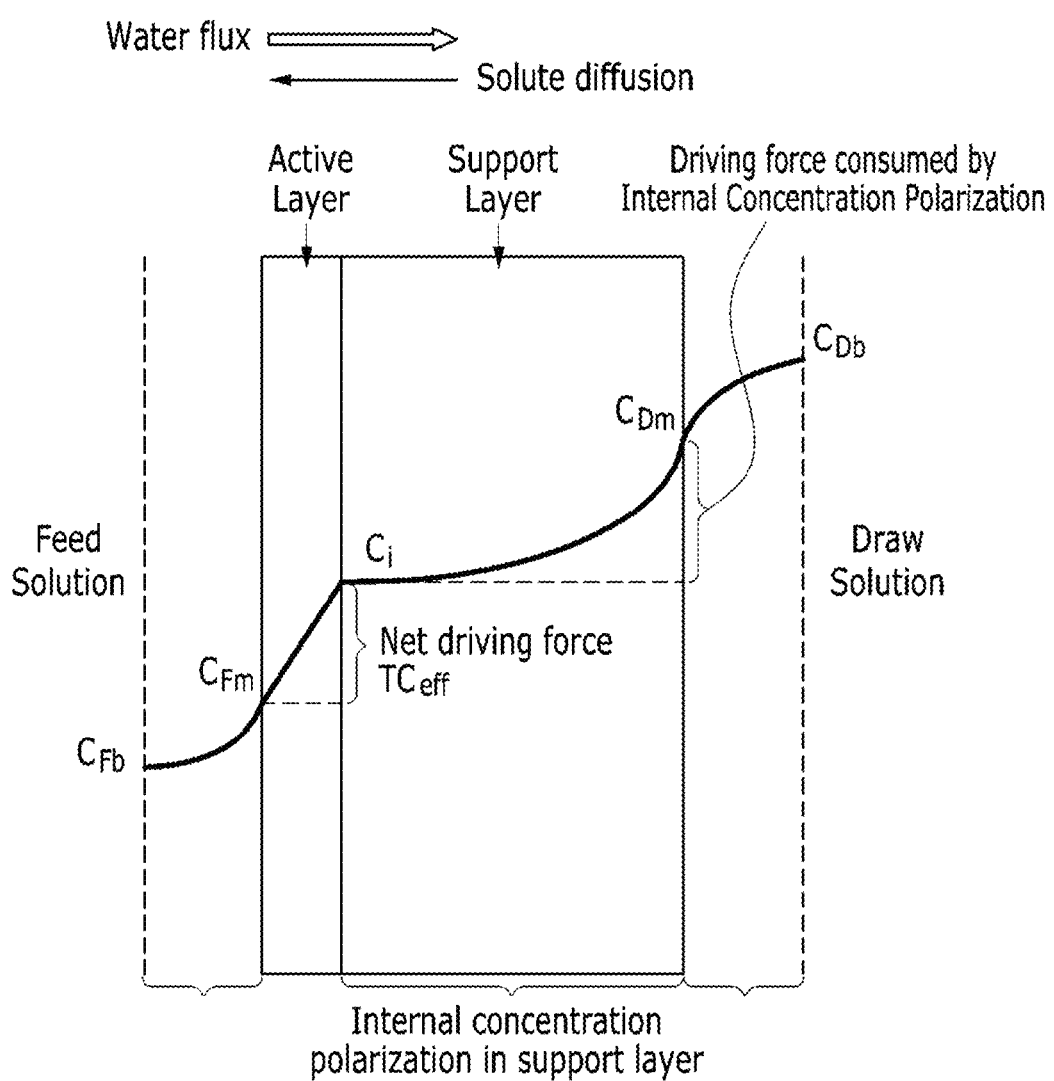
FIG. 1 is a view schematically illustrating an internal concentration polarization (ICP) phenomenon in a conventional semi-permeable membrane.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, the term "substitute" refers to replacing one or more hydrogen atoms in a given moiety with a C1 to C10 alkyl group, a C1 to C10 aminoalkyl group, a glycidyl ether group, a sulfonyl group, a vinyl group, a chloro group, a phenyl group, or a combination thereof.

According to one example embodiment, a semi-permeable membrane may include a support layer and an active layer that is in contact with the support layer. The support layer includes a porous structure including a polymer and at least one metal (or metalloid) oxide in the porous structure. For example, the metal (or metalloid) oxide may include at least one selected from a silicon oxide, a titanium oxide, a zirconium oxide, an aluminum oxide, a zeolite, and a combination thereof. The metal (or metalloid) oxide may be distributed in the porous structure in such a manner that the amount thereof may exhibit a concentration gradient rising toward the interface between the support layer and the active layer. As used herein, the term "concentration gradient" of the metal (or metalloid) oxide refers to a gradual difference in the concentration of the metal (or metalloid) oxide between a region that is relatively close to the interface of the support layer and the active layer and a region that is relatively far from the interface of the support layer and the active layer (e.g., a region close to a surface of the support layer being in contact with an osmosis draw solution). The concentration gradient may include a slight fluctuation. The metal (or metalloid) oxide distributed in the porous structure shows a maximum concentration at or near the interface of the support layer with the active layer, and as distance therefrom increases, the concentration of the metal (or metalloid) oxide gradually decreases. The semi-permeable membrane having the aforementioned structure may have enhanced hydrophilicity together with higher strength and thereby it may decrease internal concentration polarization (ICP) while showing higher water flux.

Conventional semi-permeable membranes used in an osmosis process (e.g., a forward osmosis process) inevitably have internal concentration polarization (ICP) as illustrated in FIG. 1 and/or reverse salt flux, both of which may cause a significant loss in water flux. With reference to FIG. 1, the concentration of the draw solution, $C_{Dm}$ may decrease to $C_i$ near the active layer due to the internal concentration polarization occurring in the support layer. In addition, when the process is conducted, the draw solute in the draw solution may move across the active layer toward the feed solution, causing the feed solution concentration $C_{FD}$ to increase to $C_{Fm}$. Therefore, during the forward osmosis process, an osmotic pressure is actually generated by a concentration difference between $C_i$ and $C_{Fm}$, which is far lower than a desired concentration difference between $C_{Dm}$ and $C_{Fb}$. This phenomenon may greatly reduce the amount of water flowing across the active layer toward the draw solution.

By contrast, in the semi-permeable membrane according to an example embodiment, the support layer includes a first amount of the metal (or metalloid) oxide at a first region adjacent to the active layer, which is greater than a second amount of the metal (or metalloid) oxide at a second region that is farther from the active layer than the first region. In an example embodiment, the metal (or metalloid) oxide (e.g., silica) is distributed in such a manner that it may exhibit a concentration gradient rising or increasing toward the interface between the support layer and the active layer. In an example embodiment, the metal (or metalloid) oxide may exhibit a maximum concentration at or near the interface between the support layer and the active layer. Thus, where the support layer includes a first surface and an opposing second surface (and the active layer is in contact with the first surface of the support layer), the amount of the metal (or metalloid) oxide decreases from the first surface to the second surface. Conversely, the amount of the metal (or metalloid) oxide increases from the second surface to the first surface of the support layer.

When the support layer includes the metal (or metalloid) oxide in the aforementioned manner, the interface between the support layer and the active layer may have enhanced hydrophilicity, making it possible to prevent or suppress the draw solute from moving across the active layer toward the feed solution. As a result, (for example, in case of the forward osmosis water treatment) the draw solute ion may move through the support layer and become concentrated near the interface with the active layer, such that the membrane may thereby exhibit a higher concentration, $C_i$, near the active layer, and the membrane may efficiently suppress the reverse salt flux across the active layer. Moreover, in the aforementioned semi-permeable membrane, water moving across the active layer from the feed solution by the osmotic pressure may pass with relative ease through the support layer to reach the draw solution. As a result, the flow amount of water (i.e., water flux) may greatly increase while the reverse solute flux is suppressed. In an example embodiment, the semi-permeable membrane may have a water flux of greater than or equal to about 20 LMH (L/hr/m$^2$), for example, greater than or equal to about 25 LMH, greater than or equal to about 30 LMH, greater than or equal to about 40 LMH, or greater than or equal to about 50 LMH, in a forward osmosis process using distilled water and a 0.1 M NaCl solution. In addition, the semi-permeable membrane may have a reverse solute flux of less than or equal to about 8 GMH, for example, less than or equal to about 7.8 GMH, less than or equal to about 7.5 GMH, less than or equal to about 7.4 GMH, or less than or equal to about 7.2 GMH, in a forward osmosis process using distilled water and a 0.1 M NaCl solution. The aforementioned semi-permeable membrane is a type of organic-inorganic composite membrane, and the metal (or metalloid) oxide formed therein may contribute to enhancing the membrane strength and may also provide improved thermal properties and chemical resistance.

Most of conventional production methods for the organic-inorganic composite membrane blend an organic polymer solution and an inorganic particle (or a precursor thereof) together to form a support layer. In such cases, the inorganic particle may have only a weak interaction with the organic polymer so that the inorganic particles may become aggregated, resulting in non-uniform blending. Therefore, the inorganic particle or the precursor thereof may be added only in a limited amount. For example, blending a large amount of the inorganic particle or the precursor thereof makes the production of a membrane difficult.

By contrast, the semi-permeable membrane of the example embodiments includes the metal (or metalloid) oxide being distributed in the support layer so as to have a concentration gradient that rises or increases toward the interface between the support layer and the active layer. As will be explained in more detail below, the membrane having the foregoing structure may be prepared by preparing a porous structure including a polymer and then applying a (colloidal) solution including a precursor of the metal (or metalloid) oxide to the structure, and drying the structure holding the colloidal solution therein to form the metal (or metalloid) oxide in an in-situ manner via a sol-gel reaction. The aforementioned method makes it possible to distribute the metal (or metalloid) oxide in the porous structure without causing segregation between inorganic particles and the organic material and to increase the amount of the metal (or metalloid) oxide with relative ease. The suitable types of the metal (or metalloid) oxide are not particularly limited as long as they may be formed in the porous structure in an in-situ manner via a sol-gel reaction.

The porous structure including a polymer is included in the support layer of the semi-permeable membrane. The polymer may be any polymer that may be used in the preparation of the semi-permeable membrane and is not particularly limited. For example, the polymer may be polysulfone, polyethersulfone, polyphenyl sulfone, polycarbonate, polyethylene oxide, polyimide, polyetherimide, polyetherether ketone, polypropylene, polymethyl chloride, polyvinylidene fluoride, acrylonitrile copolymer, cellulose triacetate, cellulose acetate, cellulose ester, polystyrene, a derivative thereof, or a combination thereof. The porous structure may be any porous polymeric support and is not particularly limited. In an example embodiment, the porous structure may be a fiber assembly including fiber. In an example embodiment, the porous structure may have any form such as nonwoven or woven fabric. The fiber may include hydrophobic fiber such as polyester, polystyrene, polyethylene, polypropylene, or a combination thereof. The thickness of the support layer may be less than or equal to about 150 μm, for example, less than or equal to about 100 μm, or less than or equal to about 50 μm, but it is not limited thereto.

The porous structure may include a metal ion complex compound. For example, the metal ion complex may have a chemical structure as follows:

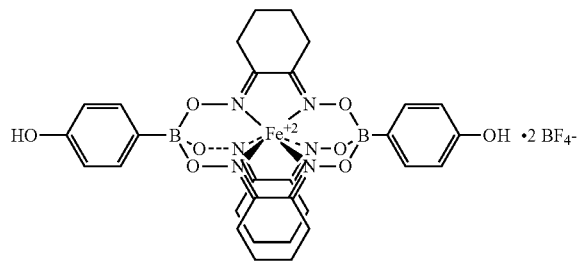

In the metal ion complex compound having the above structure, an Fe$^{2+}$ ion has a strong bond for each of the oxime groups. In particular, the compound has a cage structure confined by two boron atoms and three cyclo-hexanedione dioxime groups, and the ions are relatively hard to dissociate and thus the compound has a desired level of chemical stability. The hydroxyl groups at both ends may participate in the silane condensation reaction of TEOS and thus the compound may be included in a repeating unit of the polysiloxane polymer.

The metal ion complex compound that may be used in a casting process has a metal cation and four to six ligands and forms a complex with an anion, and thus it may be dissolved in a solvent for a polymer such as DMF, DMAc, NMP, and the like. The metal cation may be $Fe^{2+}$, $Co^{2+}$, $Ni^{2+}$, $Cu^{2+}$, $Zn^{2+}$, or the like, but it is not limited thereto. As shown in the above chemical structure, the metal cation may be $Fe^{2+}$. The metal ion complex compound may be a macrocyclic complex compound including a cage structure formed by the six ligands. As stated above, the hydroxyl end group may participate in the reaction for preparing the metal (or metalloid) oxide (e.g., a silane based condensation polymerization). In the above structured metal ion complex compound, the nitrogen of the dioxime groups may be linked to the metal ion.

The support layer is in contact with a relatively thin and dense active layer. The active layer plays a role of conducting selective permeation. For example, the active layer is permeable to water and substantially impermeable to the solute (i.e., the substance to be separated). The active layer may include, but is not limited to, polyamide, cellulose triacetate, cellulose acetate, cellulose ester, polyimide, polyurethane, polybenzimidazole, copolymers thereof, or a combination thereof. In some example embodiments, the active layer may be formed by interface polymerization. The porous structure including a polymer may be an integral, unsymmetric membrane including cellulose triacetate/cellulose acetate, and in this case, the support layer and the active layer may include the same polymer.

The metal (or metalloid) oxide distributed in the support layer may be silica; an organosilica having a C1 to C20, substituted or unsubstituted, aminoalkyl group; an organosilica having a group represented by $H_2N$—R—NH—R— (wherein R may be the same or different, and may be a C1 to C10 substituted or unsubstituted alkylene group); an organosilica having a glycidoxy group represented by Chemical Formula A,

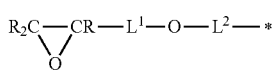

Chemical Formula A wherein R may be the same or different, and are each independently hydrogen or a C1 to C10, substituted or unsubstituted alkyl group, $L^1$ and $L^2$ are each independently a C1 to C10 substituted or unsubstituted alkylene group, and * is a part that is linked to a Si moiety; titania; zirconia; alumina; zeolite; or a combination thereof.

The metal (or metalloid) oxide may be distributed as stated above, for example by the production method of the semi-permeable membrane that will be explained below.

The amount of the metal (or metalloid) oxide included in the semi-permeable membrane may be controlled as desired and is not particularly limited. According to conventional methods, the semi-permeable membrane including a support layer having metal oxide particles is prepared by adding an organic polymer solution include oxide particles to the porous structure. In such case, it is very difficult to increase the amount of the oxide particles being added to the porous structure, and the semi-permeable membrane may hardly have a high concentration of the metal oxide adjacent to the active layer.

However, in accordance with the aforementioned example embodiments, the porous structure including a polymer is first prepared and a precursor of a metal (or metalloid) oxide is added thereto to form the metal (or metalloid) oxide via sol-gel reaction and in an in-situ manner. Therefore, it becomes possible to increase the amount of the metal (or metalloid) oxide if necessary and the composite membrane thus prepared has a relatively high concentration of the metal (or metalloid) oxide in the immediate vicinity of the active layer. For example, in the semi-permeable membrane, the amount of the metal (or metalloid) oxide may be greater than or equal to about 5%, for example greater than or equal to about 10% when being measured at an adjacent portion (e.g., an adjacent first surface) to the active layer. The metal (or metalloid) oxide may be distributed in such a manner that at least about 90%, for example, at least about 95%, or at least about 99% of a total amount of the oxide is present within 50% of a total thickness of the support layer from the interface between the support layer and the active layer (e.g., the half of the support layer closest to the active layer). The thickness of the semi-permeable membrane may be less than or equal to about 150 μm, for example, less than or equal to about 100 μm.

In another example embodiment, a production method of the semi-permeable membrane may include obtaining a support layer including a porous structure having a polymer; preparing an active layer that is in contact with the support layer; obtaining a colloidal solution including a solvent and at least one selected from a precursor of a metal (or metalloid) oxide, a hydrolyzed product thereof, and a condensation-polymerization product thereof; and contacting the colloidal solution with the porous structure and drying the same to form a metal (or metalloid) oxide in the porous structure so that in the support layer, the amount of the metal (or metalloid) oxide being present adjacent to the active layer is greater than the amount of the metal (or metalloid) oxide being present farther from the active layer.

In an embodiment, the colloidal solution does not include an organic polymer. The organic polymer may be polysulfone, polyethersulfone, polyphenylsulfone, polycarbonate, polyethylene oxide, polyimide, polyetherimide, polyetherether ketone, polypropylene, polymethyl chloride, polyvinylidene fluoride, an acrylonitrile copolymer, cellulose triacetate, cellulose acetate, cellulose ester, polystyrene, a derivative thereof, or a combination thereof.

The precursor of the metal (or metalloid) oxide may be any compound being able to form the metal (or metalloid) oxide in the porous structure via the sol-gel reaction in an in-situ manner, and the suitable types thereof are not particularly limited. The formation of the metal (or metalloid) oxide via the sol-gel reaction may include a) hydrolysis of the precursor and condensation polymerization of the hydrolyzed precursor, i.e., sol formation and gelation; and b) aging and drying.

The hydrolysis and the condensation polymerization may occur simultaneously and the reaction rate may depend on the types of the precursor and the reaction conditions such as pH and temperature, which may be selected appropriately. Without wishing to be bound by any theory, the hydrolysis and the condensation polymerization using an alkoxy precursor may be explained by the following reaction scheme:

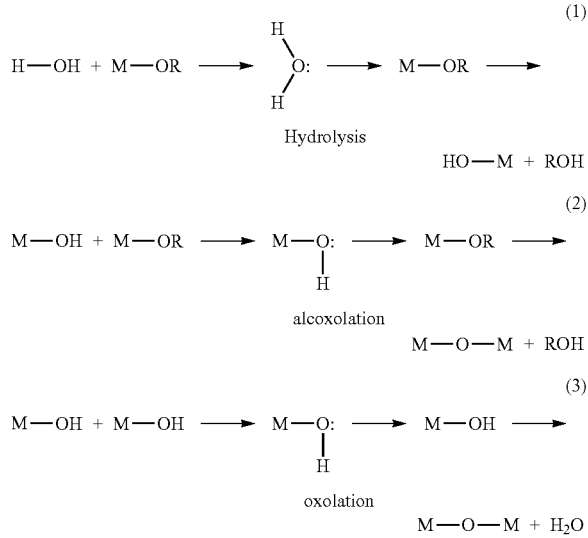

Hydrolysis alcoxolation oxolation

In an example embodiment, hydrolysis of the alkoxy precursor represented by M-(OR)n, wherein n is determined by the valence of the metal M, may occur by nucleophilic substitution of the alkoxy group by water. After the nucleophilic substitution, a proton is added and the hydrolyzed precursor (M-OH) may react with an alkoxy precursor (via alcoxolation) and with another hydrolyzed precursor (via oxolation) to conduct condensation polymerization. Other types of precursors having a hydroxyl group or a chloride group instead of the alkoxy group may form a metal (or metalloid) oxide via similar reaction schemes.

In an example embodiment, the precursor of the metal (or metalloid) oxide may be represented by Chemical Formula 1-a or Chemical Formula 1-b.

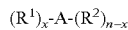   Chemical Formula 1-a

Herein, A is Si, Ti, Zr, or Al, $R^1$ are the same or different, and are each independently hydrogen, a substituted or unsubstituted straight or branched C1 to C10 alkyl group such as methyl or ethyl, a substituted or unsubstituted straight or branched 02 to C10 alkenyl group such as a vinyl group, a substituted or unsubstituted straight or branched C1 to C10 amine group, or a glycidyl ether group, $R^2$ are the same or different, and are each independently a hydroxyl group, —Cl, or a straight or branched C1 to C10 alkoxy group, n is 3 or 4, x is 0, 1, or 2, and n−x is greater than or equal to 2.

   Chemical Formula 1-b

Herein, A is Si or Ti, L is a direct bond, —O—, or a C1 to C10 alkylene group, $R^3$ are the same or different and are each independently hydrogen, a substituted or unsubstituted straight or branched C1 to C10 alkyl group, $R^4$ are the same or different and are each independently a hydroxyl group, —Cl, or a C1 to C10 alkoxy group, $R^5$ are the same or different and each is independently hydrogen or a substituted or unsubstituted straight or branched C1 to C10 alkyl group, $R^6$ are the same or different and are each independently a hydroxyl group, —Cl, or a C1 to C10 alkoxy group, y is 0, 1, or 2, and z is 0, 1, or 2.

In the support layer, the concentration of the metal (or metalloid) oxide may be higher in a portion adjacent to (e.g., closest to) the active layer than in a portion farther from the active layer. In the support layer, the amount of the metal (or metalloid) oxide may have a concentration gradient that increases toward the interface of the active layer and the support layer. Details of the aforementioned structure are the same as set forth above.

The support layer including the porous structure including a polymer (hereinafter also referred to as a porous polymer structure) may be prepared in an appropriate method. In an example embodiment, the porous polymer structure may be prepared by dissolving an organic polymer in a solvent to prepare a polymer solution and contacting a porous support (e.g., a fiber assembly) with the polymer solution (e.g., applying the polymer solution to the porous support and allowing it to infiltrate therein). The types of the organic polymer and the porous support (e.g., fiber assembly) are the same as set forth above. The molecular weight of the polymer is not particularly limited, and may be selected appropriately in consideration of the types of the polymer. The solvent may be any one capable of dissolving the polymer, and its type may depend on the polymer. For example, when polysulfone is used as the polymer, DMF (dimethyl formamide) is used as a solvent, but it is not limited thereto. When polyvinylidene fluoride is used as the polymer, the solvent may be dimethylacetamide, but it is not limited thereto. Removal of the solvent may be carried out by putting the polymer support (e.g., fiber assembly) including the polymer solution into water, but it is not limited thereto.

Formation of the active layer may be carried out before or after the metal (or metalloid) oxide is formed within the porous structure. Materials for the active layer are the same as set forth above. The active layer may be formed in any suitable manner, which may depend on the types of the polymer, and suitable known methods may be employed. In some example embodiments, polyamide is used as the active layer and may be formed via interface polymerization of a multifunctional amine and a multifunctional acylhalide. When the active layer includes a polyamide thin film, the semi-permeable membrane thus obtained has enhanced salt removal efficiency.

In non-limiting examples, the interface polymerization of the multi-functional amine and the multifunctional acyl halide includes applying an aqueous amine solution including a multi-functional amine to the prepared support layer, removing an extra amount of the aqueous amine solution from the support layer, and applying an organic solution including a multifunctional acyl halide on the support layer containing the amine aqueous solution. Examples of the multifunctional amine may include, but are not limited to, m-phenylene diamine, p-phenylene diamine, 1,3,6-benzene triamine, 4-chloro-1,3-phenylene diamine, 6-chloro-1,3-phenylene diamine, and 3-chloro-1,4-phenylene diamine. The multifunctional amine may be used alone or in a combination thereof. In non-limiting examples, m-phenylene diamine is used alone. Examples of the multifunctional acylhalide may include, but are not limited to, trimesoyl chloride. The multifunctional acyl halide may be used alone or in combination thereof. The solvent for the multifunctional acyl halide is known in the art, and for example, i-sol E may be used.

The metal (or metalloid) oxide may be formed in the porous structure prior to or after the formation of the active layer that is in contact with the support layer including the porous structure. The formation of the metal (or metalloid) oxide is explained above in detail. In an example embodiment, the formation of the metal (or metalloid) oxide may be carried out by preparing a colloidal solution including a solvent and at least one of a precursor for the metal (or metalloid) oxide represented by Chemical Formula 1-a or Chemical Formula 1-b, a hydrolyzed product thereof, or a condensation-polymerization product thereof; bringing the colloidal solution into contact with the porous structure; and removing the solvent.

The precursor of the metal (or metalloid) oxide represented by Chemical Formula 1-a or Chemical Formula 1-b may be tetramethoxy silane, tetraethoxysilane, trimethoxyethylsilane, triethoxyethylsilane, 1,2-bis(triethoxysilyl)ethane, titanium tetraisopropoxide, zirconium n-propoxide, or aluminum isopropoxide. The precursor of the metal (or metalloid) oxide may be used alone or in combination thereof. The solvent may be a C1 to C5 straight or branched alcohol such as methanol, ethanol, or n-propanol, or a combination thereof. The hydrolyzed product or the condensation polymerization product of the precursor of the metal (or metalloid) oxide may be formed under any known conditions in any known manners. The colloidal solution may be formed by conducting a reaction (e.g., hydrolysis and/or condensation polymerization) in the presence of an acid or base catalyst and/or in the presence of a surfactant. In an example embodiment, a silane compound (e.g., tetraethoxy silane) is used to produce a silicon oxide (e.g., silica) as below.

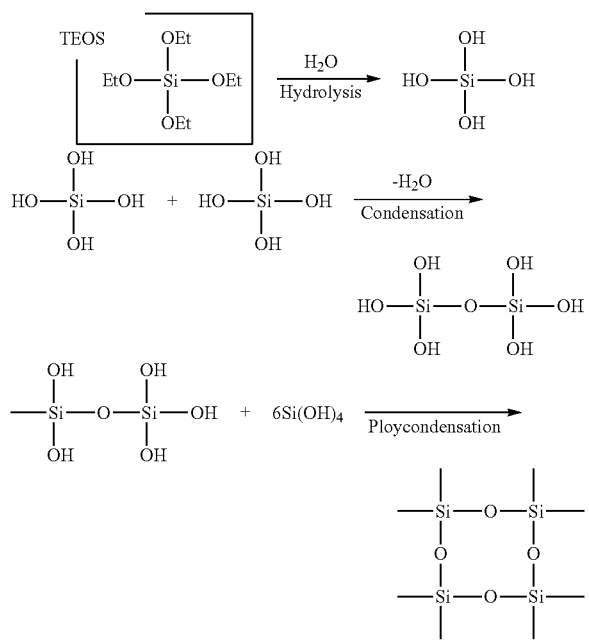

An inorganic acid such as hydrochloric acid and nitric acid, an organic acid such as acetic acid, or a combination thereof may be used as the acid catalyst. Examples of the base catalyst may include amines. Examples of the surfactant may include, but are not limited to, cetyltriethyl ammonium bromide. The amount of the catalyst and the surfactant may be selected appropriately depending on the types and the amounts of the precursor.

The colloidal solution prepared from the aforementioned reaction may include the precursor of the metal (or metalloid) oxide, the hydrolyzed product thereof, and/or the condensation polymerization product thereof. The colloidal solution thus prepared is brought into contact with the porous polymer structure (for example, by pouring the colloidal solution substantially uniformly over the surface of the structure and allowing the same to infiltrate into the structure using gravity) and is dried so that the metal (or metalloid) oxide is formed to have a concentration gradient in the porous structure as mentioned above.

Figure 3:
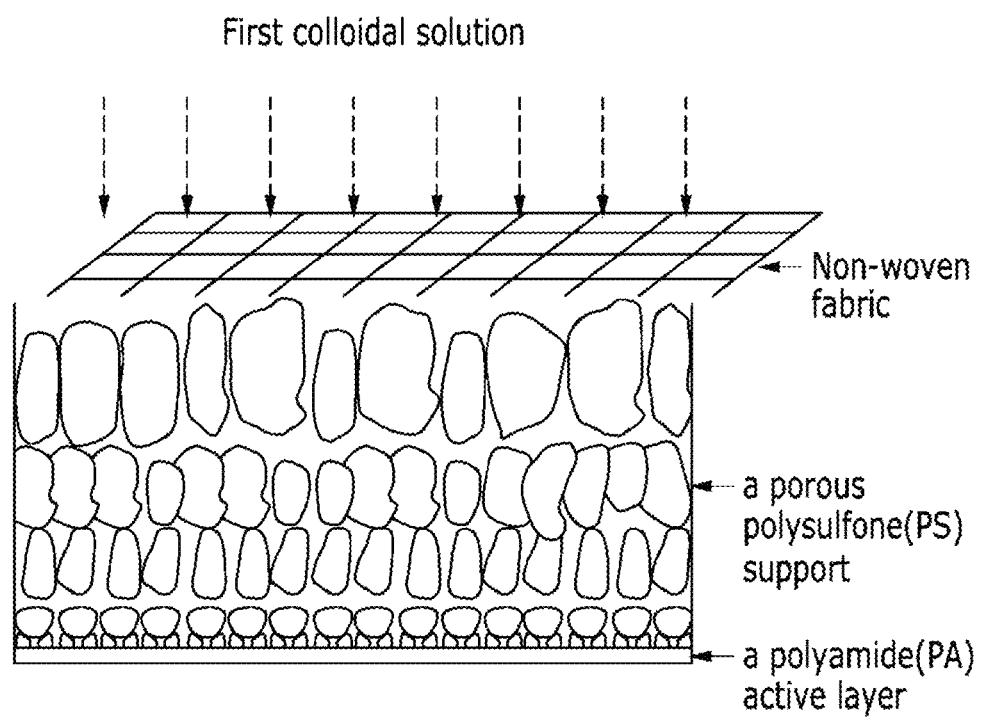
FIG. 3 is a view schematically illustrating a part of a production process of a semi-permeable membrane.

When the formation of the metal (or metalloid) oxide is made after the formation of the active layer, the colloidal solution is applied onto the surface (e.g., second surface) of the support layer that is opposite to the surface (e.g., first surface) facing the active layer and is allowed to infiltrate into the porous structure, for example, by gravity (see FIG. 3). When the formation of the metal (or metalloid) oxide is performed prior to the formation of the active layer, the colloidal solution being applied onto a surface of the support layer moves toward the bottom surface of the structure and thereby a majority of the amount of the metal (or metalloid) oxide is formed near the bottom surface. Then, the active layer is formed to be in contact with the bottom surface of the porous polymer structure. The drying (i.e., the removal of the solvent) may be carried out in any suitable manner. For example, the drying is carried out at a temperature of less than or equal to about 100° C., less than or equal to about 90° C., less than or equal to about 80° C., less than or equal to about 70° C., less than or equal to about 60° C., less than or equal to about 50° C., less than or equal to about 40° C., or less than or equal to about 30° C. (for example, at room temperature), and under any suitable pressure (for example at atmospheric pressure or a reduced pressure). The drying may be carried out in a dark room. The viscosity of the colloidal solution is not particularly limited and may be selected appropriately.

The method may further include preparing a solution including a solvent and at least one selected from a compound represented by Chemical Formula 2, a hydrolyzed product thereof, and a condensation polymerization product thereof, and contacting the porous structure including the metal (or metalloid) oxide with the solution and drying the same.

$$(X)_x\text{-A-}(R^7)_{n-x}$$ Chemical Formula 2

Herein, A is Si, Ti, Zr, or Al, $R^7$ are the same or different and are each independently a hydroxyl group, —Cl, or a C1 to C10 alkoxy group, n is 3 or 4, x is 1, 2, or 3, n−x is greater than or equal to 1, X are the same or different and are each independently hydrogen, a substituted or unsubstituted C1 to C10 alkyl, a substituted or unsubstituted C2 to C10 alkenyl, a substituted or unsubstituted C1 to C10 aminoalkyl, or a glycidoxy alkyl group, provided that at least one of X is a substituted or unsubstituted C1 to C10 aminoalkyl or a glycidoxy alkyl group.

The solution including the compound represented by Chemical Formula 2 and the like and the solvent may further include water and a (base or acid) catalyst. As a result of the contacting of the porous structure with the solution including the compound represented by Chemical Formula 2 and the like and the subsequent drying thereof, the metal (or metalloid) oxide having an organic moiety may be formed in the porous structure. Examples of the compound represented by Chemical Formula 2 may include, but are not limited to, aminoethyl aminopropyl trimethoxy silane, aminopropyl trimethoxy silane, glycidoxy propyl trimethoxy silane, and a combination thereof. An inorganic acid such as hydrochloric acid and nitric acid, an organic acid such as acetic acid, or a combination thereof may be used as the acid catalyst. Examples of the base catalyst may include amines. The solvent may be a C1 to C5, straight or branched alcohol or a combination thereof. The amount of water, the amount of the catalyst, and the amount of the compound represented by Chemical Formula 2 may be selected appropriately and the concentration of the solution may be selected appropriately. By the aforementioned treatment, the metal (or metalloid) oxide having a reactive organic group such as organosilica may be formed in the porous structure.

The semi-permeable membrane may be utilized in a forward osmosis or reverse osmosis water treatment apparatus. In non-limiting examples, the forward osmosis water treatment apparatus may include a feed solution including water and materials to be separated being dissolved in water; an osmosis draw solution; and a semi-permeable membrane contacting the feed solution on one side and the osmosis draw solution on the other side. In an example embodiment, the semi-permeable membrane may include a support layer and an active layer being in contact with the support layer, wherein the support layer includes a porous structure including a polymer and at least one oxide of a metal or a metalloid in the porous structure. In the support layer, the metal (or metalloid) oxide is distributed such that it may have a concentration gradient rising or increasing toward an interface between the support layer and the active layer. Details of the semi-permeable membrane are the same as set forth above.

Figure 2:
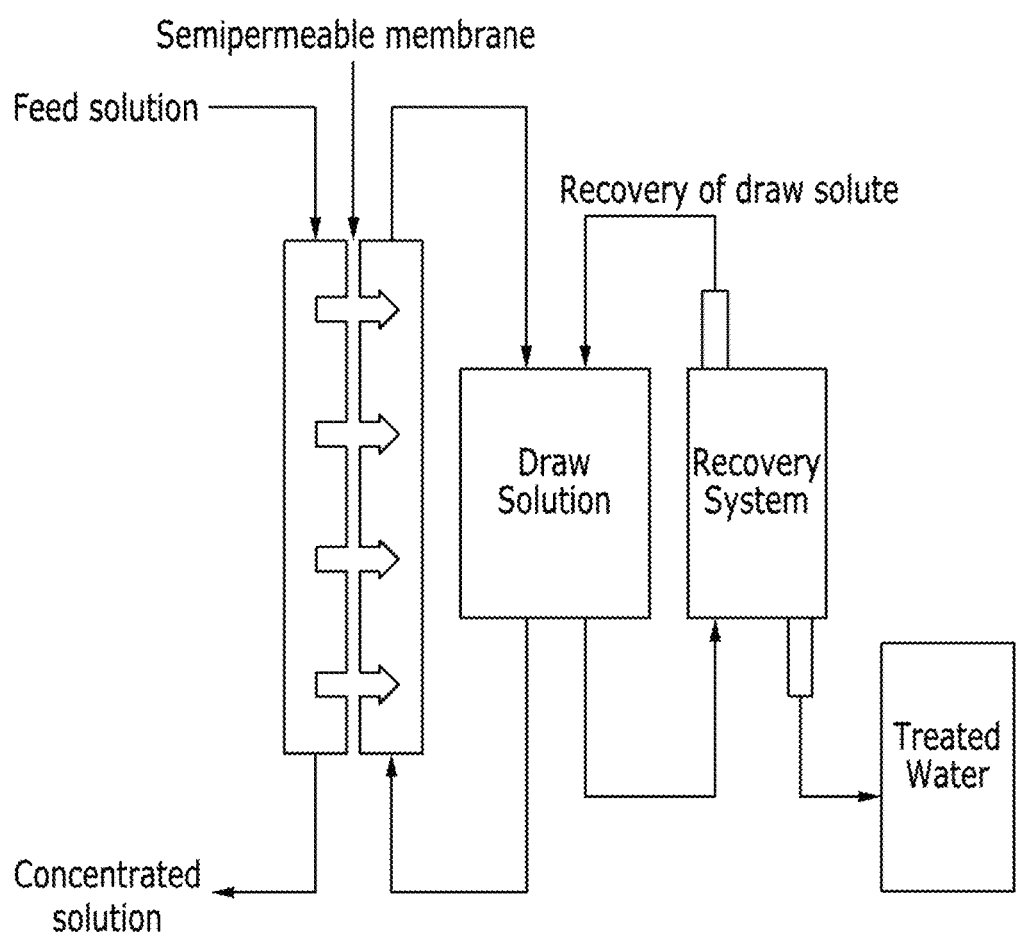
FIG. 2 is a schematic view of a forward osmosis water treatment apparatus according to an example embodiment.

Except for the semi-permeable membrane, the forward osmosis apparatus may include any known or commercially available parts and details thereof are known in the art. For example, FIG. 2 shows a schematic view of a forward osmosis water treatment apparatus according to an example embodiment. Referring to FIG. 2, the forward osmosis water treatment apparatus may further include a recovery system for removing the draw solute from a treated solution including water that moves from the feed solution to the osmosis draw solution through the semi-permeable membrane by osmotic pressure, and a connector for reintroducing the draw solute removed from the recovery system to the osmosis draw solution. The forward osmosis water treatment apparatus may further include an outlet for discharging treated water produced by removing the draw solute from the treated solution in the recovery system.

As stated above, the semi-permeable membrane is permeable to water (a solvent) and non-permeable to the materials to be separated. In addition, the semi-permeable membrane does not react with the solute and the solvent. The types of the feed solution are not particularly limited as long as they may be treated in the forward osmosis manner. The materials to be separated may be impurities. Specific examples of the feed solution may include, but are not limited to, sea water, brackish water, ground water, waste water, and the like. By way of a non-limiting example, the forward osmosis water treatment apparatus may treat sea water to produce drinking water.

The recovery system may include a microfiltration (MF) membrane, an ultrafiltration (UF) membrane, a nanofiltration (NF) membrane, or a centrifuge in order to separate the draw solute. The draw solute as removed may be introduced into the draw solution again via the connector.

In non-limiting examples, the semi-permeable membrane may be used as a selectively separating membrane in any known or commercially available reverse osmosis membrane module (e.g., a flat panel module, a tubular module, or a spiral module). Such a reverse osmosis membrane module may have a first face and a second face. The first face of the membrane may be contacted with a first solution of a first volume having a first salt concentration at a first pressure. The second face of the membrane may be contacted with a second solution of a second volume having a second salt concentration at a second pressure. The first solution can be in fluid communication with the second solution through the membrane. The first salt concentration can then be higher than the second salt concentration, thereby creating an osmotic pressure across the membrane. The first pressure can be sufficiently higher than the second pressure to overcome the osmotic pressure, thereby increasing the second volume and decreasing the first volume.

Hereinafter, the present disclosure is illustrated in more detail with reference to various examples. However, it should be understood that the following are merely examples, and the present disclosure is not limited thereto.

EXAMPLE

Reference Example

Synthesis of Metal Ion Complex Compound 0.1 g of 4-hydroxyphenyl boric acid, 0.16 g of 1,2-cyclohexanedione dioxime, and 0.12 g of $Fe(BF_4)_2 \cdot 6H_2O$ are added to 15 ml of methanol and stirred for 4 hours. After the reaction, precipitates are filtered and vacuum-dried in a drier for 24 hours. After the drying, the precipitates are subjected to hot filtration using dichloromethane and purified by recrystallization. The chemical structure of the compound thus prepared is as follows.

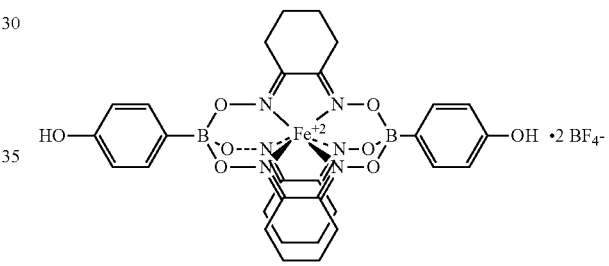

The results of $^1$H-NMR (400 MHz, $CD_2Cl_2$, 298K) analysis are as follows: [7.52-7.51 (d, J=7.6 Hz, 4 H), 6.80-6.78 (d, J=7.6 Hz, 4 H), 4.99 (s, 2 H), 2.90 (s, 12 H), 1.80 (s, 12 H)].

The metal ion complex compound thus synthesized is completely dissolved in a solvent such as DMF and mixed with a polymer solution such as polysulfone so as to be used for the preparation of the support layer.

Comparative Example 1

Polysulfone (Solvay, Udel p-3500, number average molecular weight: 80,000) is completely dissolved in DMF to produce a solution having a concentration of 13 wt %. The solution thus prepared is cooled to room temperature and deareated under a reduced pressure to obtain a casting solution. Polyester nonwoven fabric (manufactured by Hirose, product name: 05TH-12S, 17 μm) is immersed in the DMF solution and is removed therefrom and fixed on a glass plate, and then the extra amount of DMF is removed from the nonwoven fabric using a rubber roll. The casting solution is spread over the nonwoven fabric, which is then immersed in pure water for a predetermined time and removed therefrom and separated from the glass plate. When the nonwoven fabric is immersed in pure water, DMF is exchanged with water and the phase separation of the polysufone occurs. The porous structure including a polymer thus obtained (hereinafter, also referred to as the porous polymer structure) is washed with flowing water to remove the organic solvent, and the structure is dried at room temperature for 24 hours.

17.5 g of m-phenylenediamine (MPD) is dissolved in 500 mL of distilled water to prepare a MPD solution which is stored in a dark room. The porous polymer structure prepared as above is dipped into the MPD solution and an extra amount of the solution is removed with a rubber roller. Then, the structure including the MPD solution is brought into contact with a solution prepared by dissolving 0.6 g of trimesoyl chloride (TMC) in 500 mL of i-sol E solvent to conduct interface polymerization, and the structure prepared therefrom is washed with 100 mL of n-hexane and dried again to prepare a composite membrane having a polyamide thin film (with a thickness of less than 200 nm).

Figure 4A:
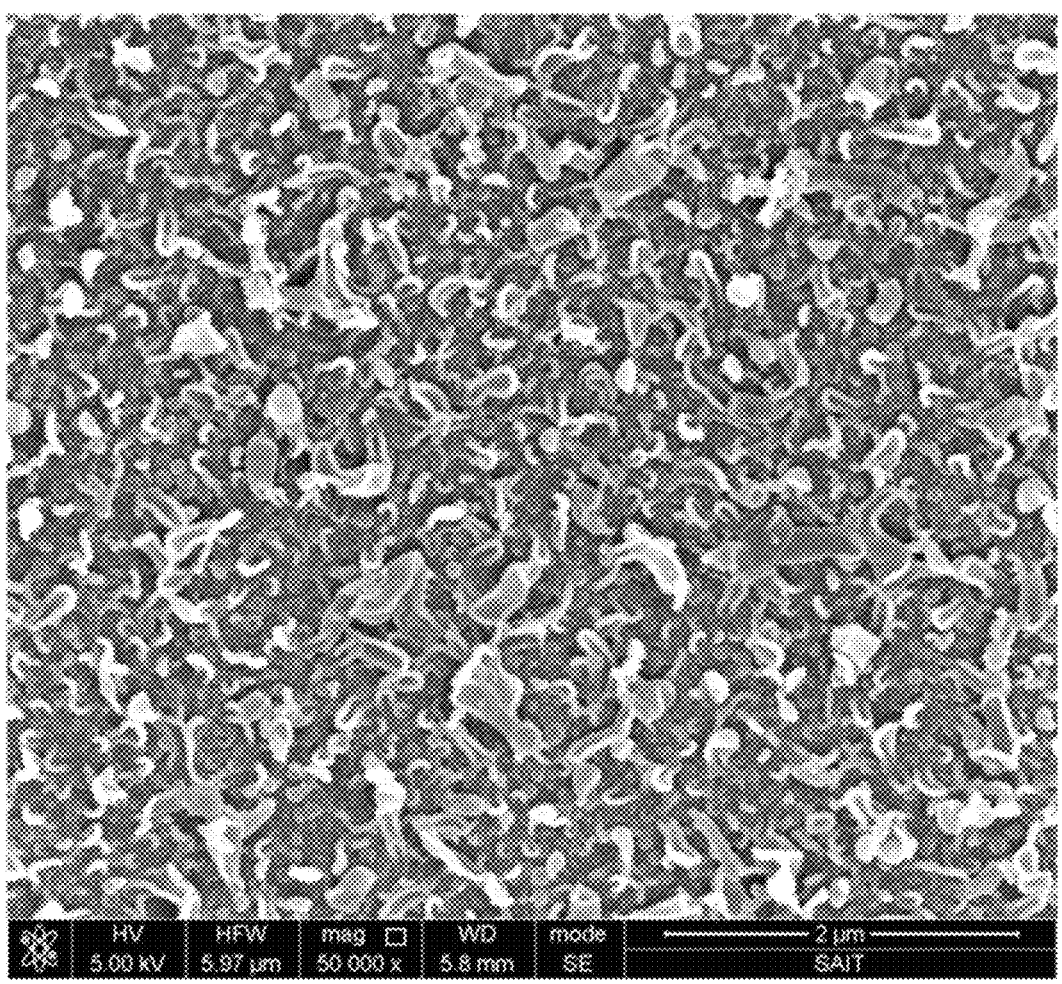
FIG. 4A and FIG. 4B are FE-SEM images of a surface and a cross-section of a composite membrane of Comparative Example 1, respectively.
Figure 4B:
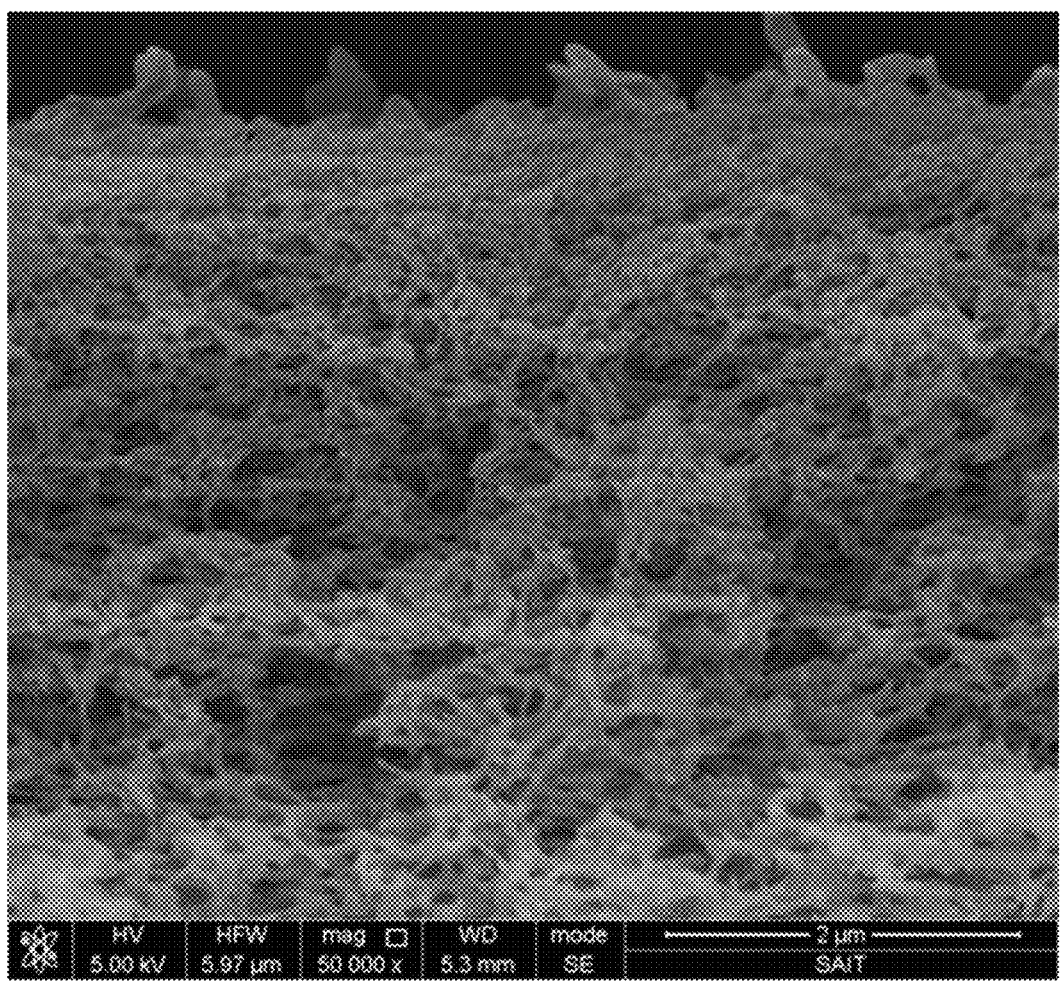
Figure 5A:
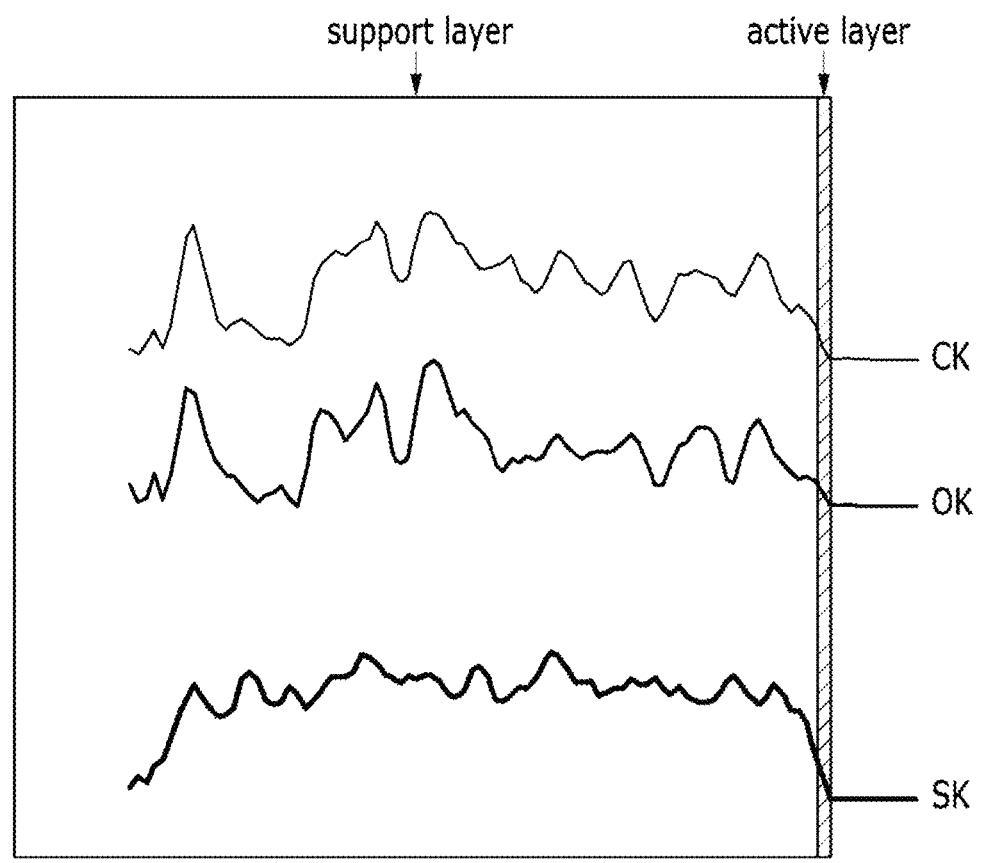
FIG. 5A and FIG. 5B show results of a SEM-EDX analysis of the composite membrane of Comparative Example 1.
Figure 5B:
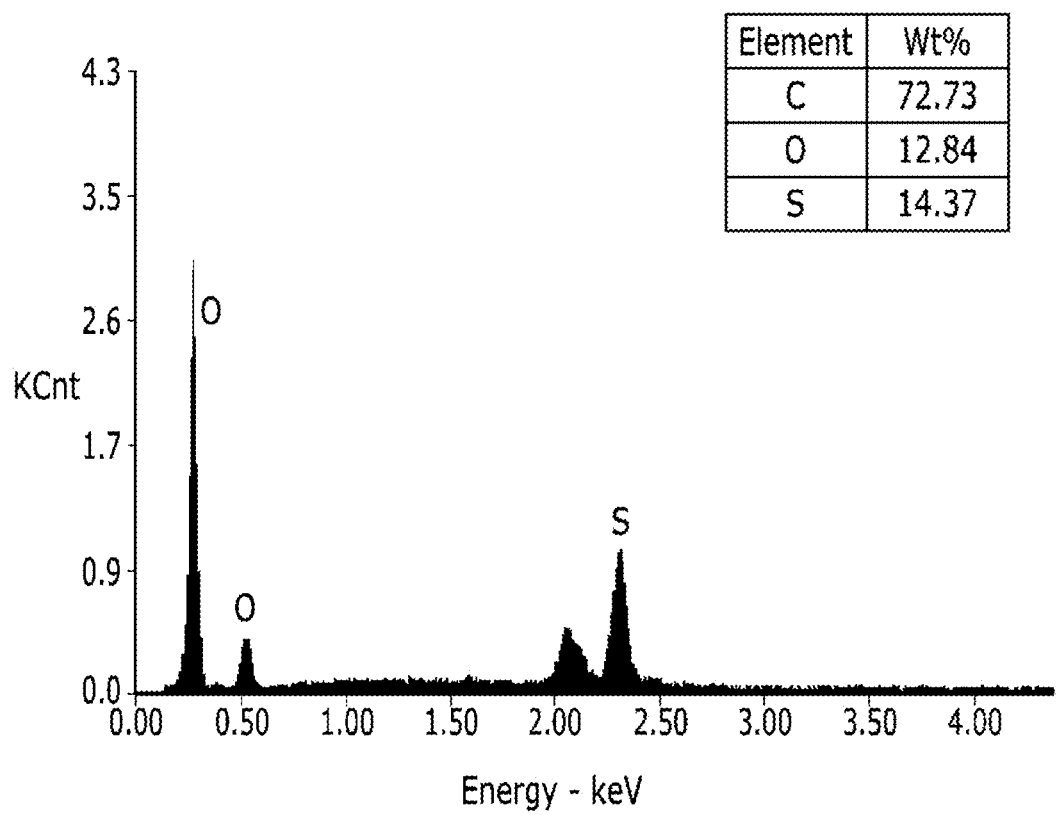

An analysis using a field effect scanning electron microscope manufactured by Hitachi Co., Ltd., (model name: FE-SEM S-4500) is made for the surface and the cross-section of the composite membrane thus prepared, and the results are shown in FIG. 4A and FIG. 4B. A scanning electron microscope—electron dispersive X-ray spectroscopy analysis is made for the composite membrane thus prepared using FE-SEM S-4500 of Hitachi Co., Ltd., and the results are schematically shown in FIG. 5A and FIG. 5B.

Comparative Example 2

A composite membrane having a polyamide thin film (with a thickness of less than 200 nm) is prepared in the same manner as Comparative Example 1, except that polysulfone (Solvay, Udel p-3500, number average molecular weight: 80,000) is completely dissolved in DMF to produce a solution having a concentration of 13 wt %, and the solution thus prepared is cooled to room temperature, blended with 11.57 g of tetraethoxysilane (TEOS), and then deareated under a reduced pressure to obtain a casting solution.

Figure 6A:
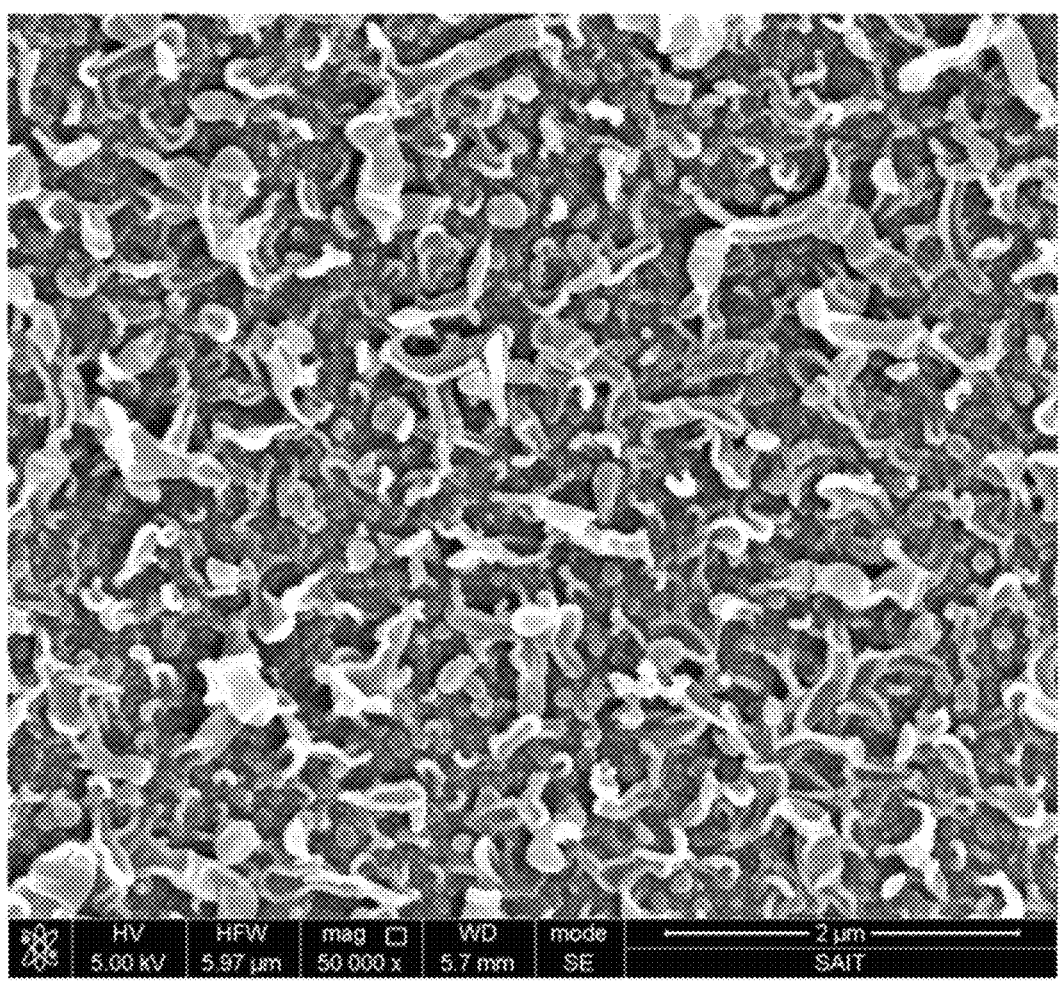
FIG. 6A and FIG. 6B are FE-SEM images of a surface and a cross-section of a composite membrane of Comparative Example 2, respectively.
Figure 6B:
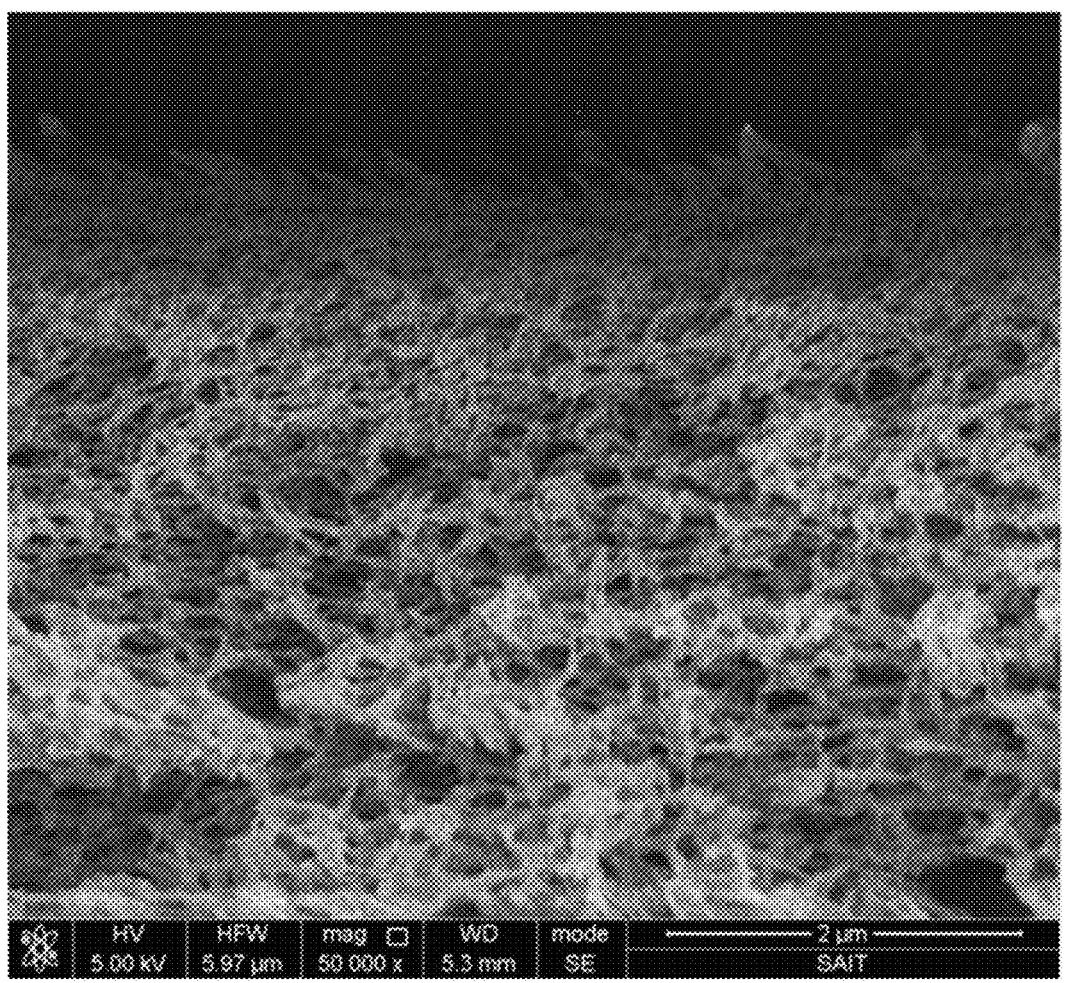
Figure 7A:
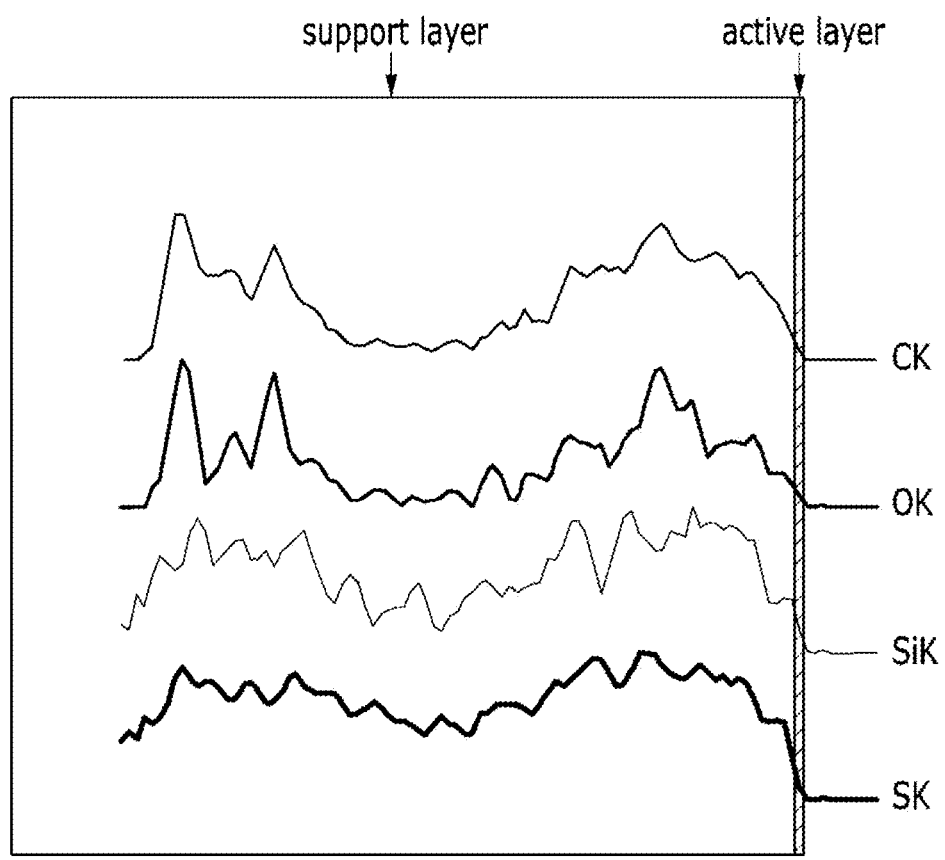
FIG. 7A and FIG. 7B show results of a SEM-EDX analysis of the composite membrane of Comparative Example 2.
Figure 7B:
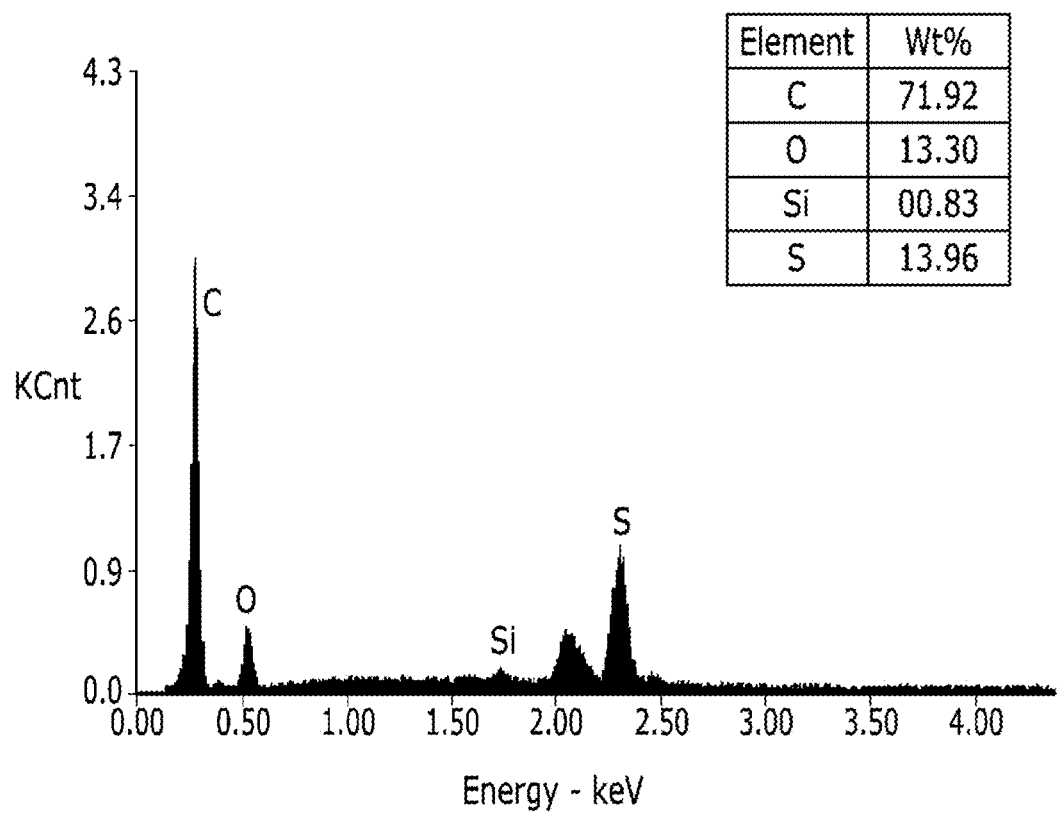

An analysis using a field effect scanning electron microscope manufactured by Hitachi Co., Ltd., (model name: FE-SEM S-4500) is made for the surface and the cross-section of the composite membrane thus prepared, and the results are shown in FIG. 6A and FIG. 6B. A scanning electron microscope—electron dispersive X-ray spectroscopy analysis is made for the composite membrane thus prepared using FE-SEM S-4500 of Hitachi Co., Ltd., and the results are schematically shown in FIG. 7A and FIG. 7B. The results confirm that in the composite membrane of Comparative Example 2, the amount of the silica included in the support layer is less than 0.1% as measured at the adjacent surface to the active layer (i.e., the polyamide thin film), and the amount of the silica fails to exhibit a concentration gradient over the total thickness of the support layer.

Example 1

Polysulfone (Solvay, Udel p-3500, number average molecular weight: 80,000) is completely dissolved in DMF to produce a solution having a concentration of 13 wt %. The solution thus prepared is cooled to room temperature and deareated under a reduced pressure to obtain a casting solution. Nonwoven polyester (manufactured by Hirose, product name: 05TH-12S, 17 μm) is immersed in the DMF solution and fixed on a glass plate, and an extra amount of DMF is removed using a rubber roll. The casting solution is spread over the nonwoven fabric, which is then immersed in pure water for a predetermined time and removed therefrom and separated from the glass plate. When the nonwoven fabric is immersed in pure water, DMF is exchanged with water and the phase separation of the polysufone occurs. The porous structure including a polymer thus obtained (hereinafter, referred to as the porous polymer structure) is washed with flowing water to remove the organic solvent, and the structure is dried at room temperature for 24 hours.

A mixed solution including 7.68 g of ethanol, 11.57 g of tetraethoxysilane (TEOS), and 1 ml of a 2.8 M HCl aqueous solution is refluxed at 60° C. for 90 minutes. A solution including 15 g of ethanol, 4 ml of a 55 mM HCl aqueous solution, and 1.52 g of cetyltriethylammonium bromide (CTAB) is added to the refluxed solution containing TEOS, and the resulting solution is refluxed again for another 30 minutes. Then, the solution is cooled to room temperature to produce a TEOS colloidal solution.

About 9 to 10 mL of the TEOS colloidal solution is uniformly added on a surface of the porous structure including polysulfone (hereinafter, referred to as porous polysulfone structure) and allowed to infiltrate into the structure using gravity. If desired, the structure is made to stand upright to remove an extra amount of the solution. The porous polysulfone structure keeping the colloidal solution therein is dried in a dark room (substantially without light) at room temperature and under a normal pressure for at least 12 hours to prepare a porous polysulfone structure including silica.

17.5 g of m-phenylenediamine (MPD) is dissolved in 500 mL of distilled water to prepare an MPD solution and stored in the dark room. The porous polysulfone structure including silica is dipped into the MPD solution and an extra amount of the solution is removed with a rubber roller. Then, the structure including the MPD solution is brought into contact with a solution prepared by dissolving 0.6 g of trimesoyl chloride (TMC) in 500 mL of i-sol E solvent to conduct interface polymerization and the structure prepared therefrom is washed with 100 mL of n-hexane and dried again to prepare a composite membrane having a polyamide thin film (with a thickness of less than 200 nm). The obtained membrane is kept in pure water.

Figure 8A:
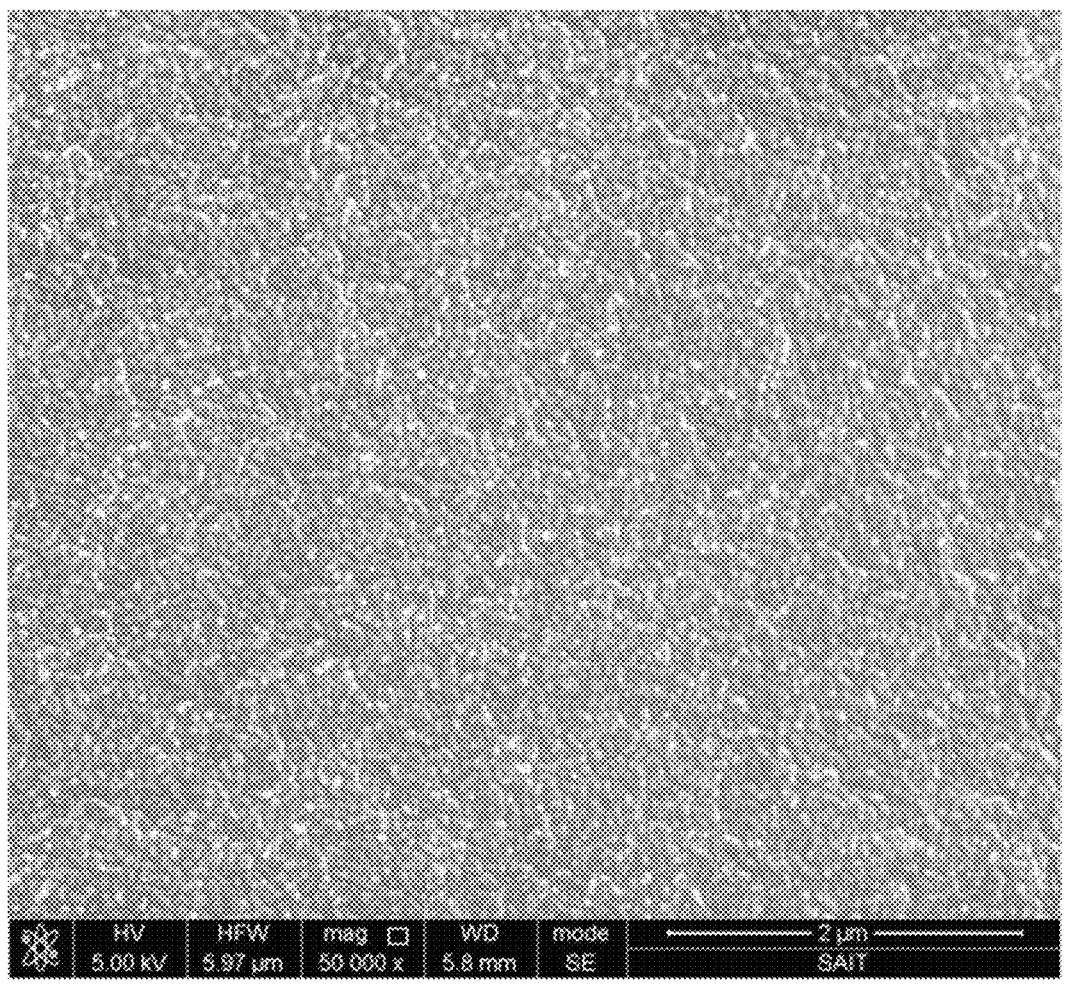
FIG. 8A and FIG. 8B are FE-SEM images of a surface and a cross-section of a composite membrane of Example 1, respectively.
Figure 8B:
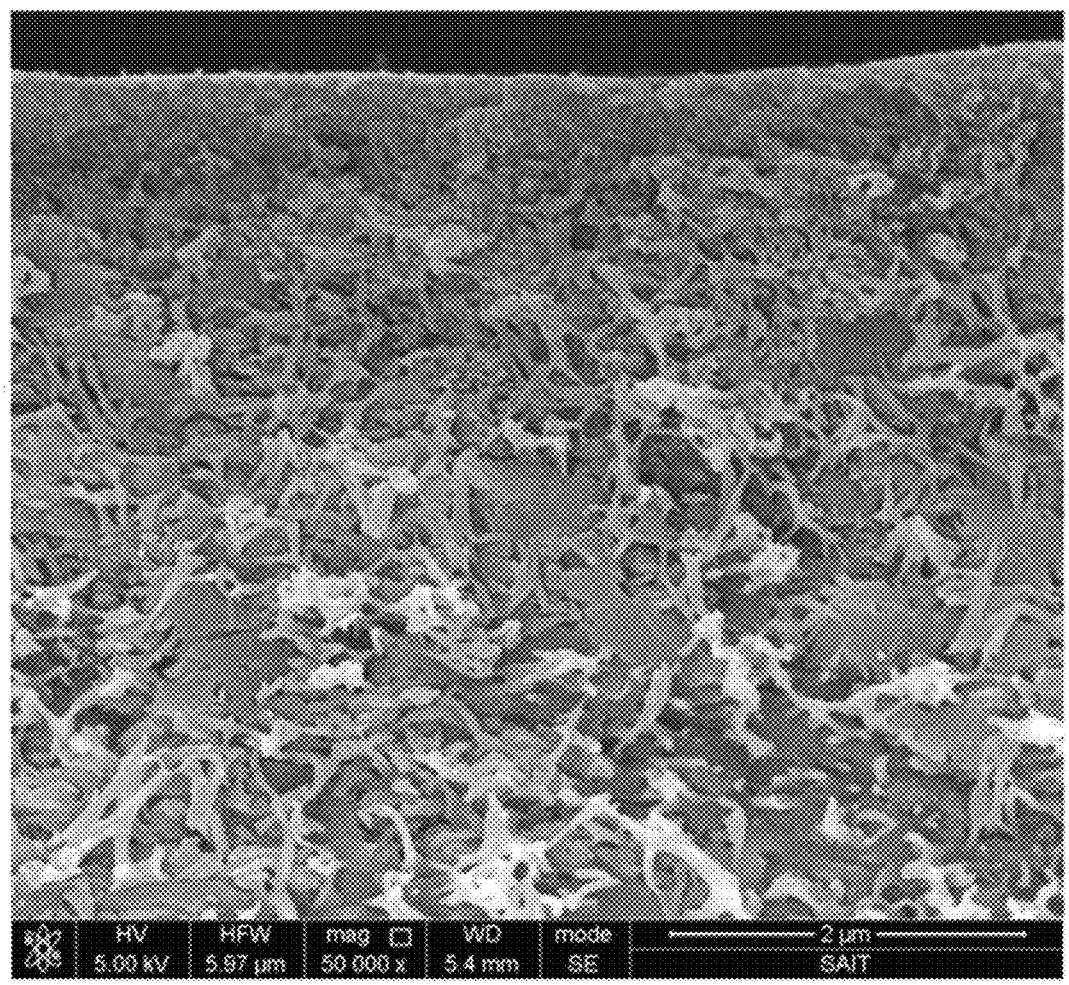
Figure 9A:
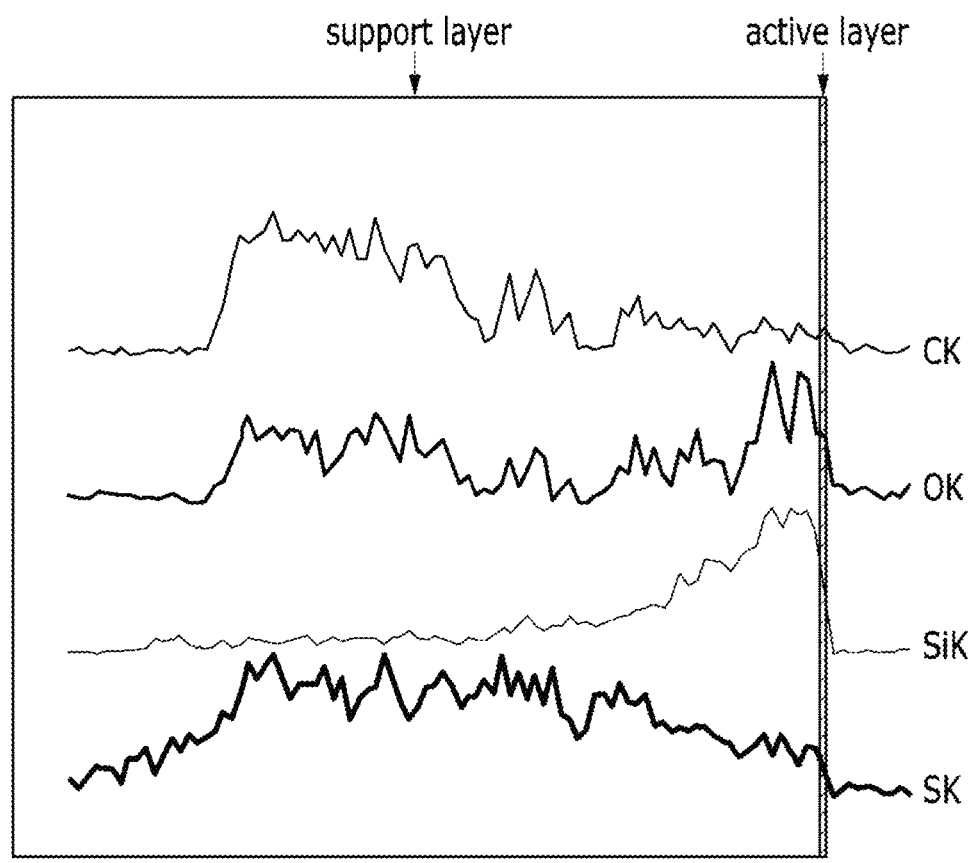
FIG. 9A and FIG. 9B show results of a SEM-EDX analysis of the composite membrane of Example 1.
Figure 9B:
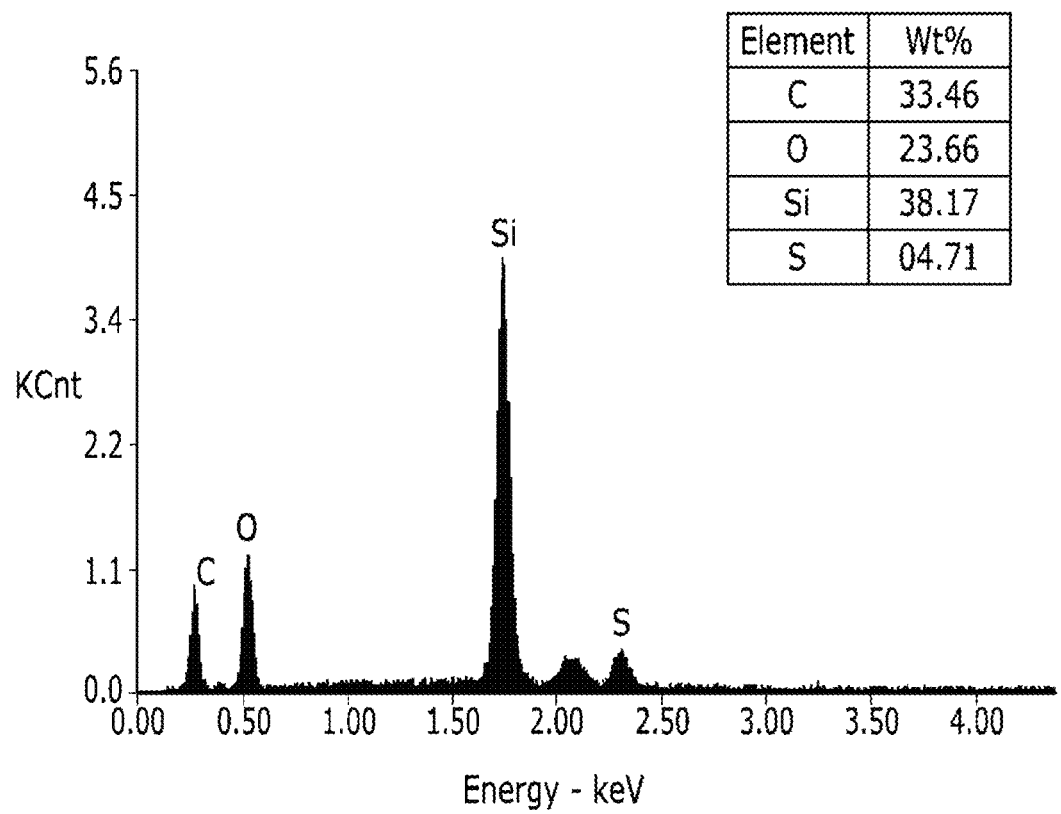

An analysis using a field effect scanning electron microscope manufactured by Hitachi Co., Ltd., (model name: FE-SEM S-4500) is made for the surface and the cross-section of the composite membrane thus prepared, and the results are shown in FIG. 8A and FIG. 8B. A scanning electron microscope—electron dispersive X-ray spectroscopy analysis is made for the composite membrane thus prepared using FE-SEM S-4500 of Hitachi Co., Ltd., and the results are schematically shown in FIG. 9A and FIG. 9B. The results confirm that the composite membrane of Example 1 has a high silica content and the silica is distributed in such a concentration gradient that it has a maximum concentration near the interface between the support layer and the active layer.

Example 2

A composite membrane is obtained in the same manner as set forth in Example 1, except that instead of the porous polysulfone including silica, the interface polymerization for polyamide is conducted with a porous polysulfone structure including organosilica that is prepared as follows.

A mixed solution consisting of 1.05 ml of $H_2O$, 0.2 mL of 11.5 M HCl, and 16 ml of EtOH is prepared, and 1 g of 3-aminopropyl-methyl-diethoxy silane is added to mL of the ethanol mixed solution and stirred to produce a 3-aminopropyl-methyl-diethoxy silane solution, which is then uniformly added on a surface of the porous polysulfone structure including silica and allowed to infiltrate into the structure using gravity. The resulting structure is dried at a temperature of 70° C. for 20 minutes to produce the porous polysulfone structure including organosilica.

Figure 10A:
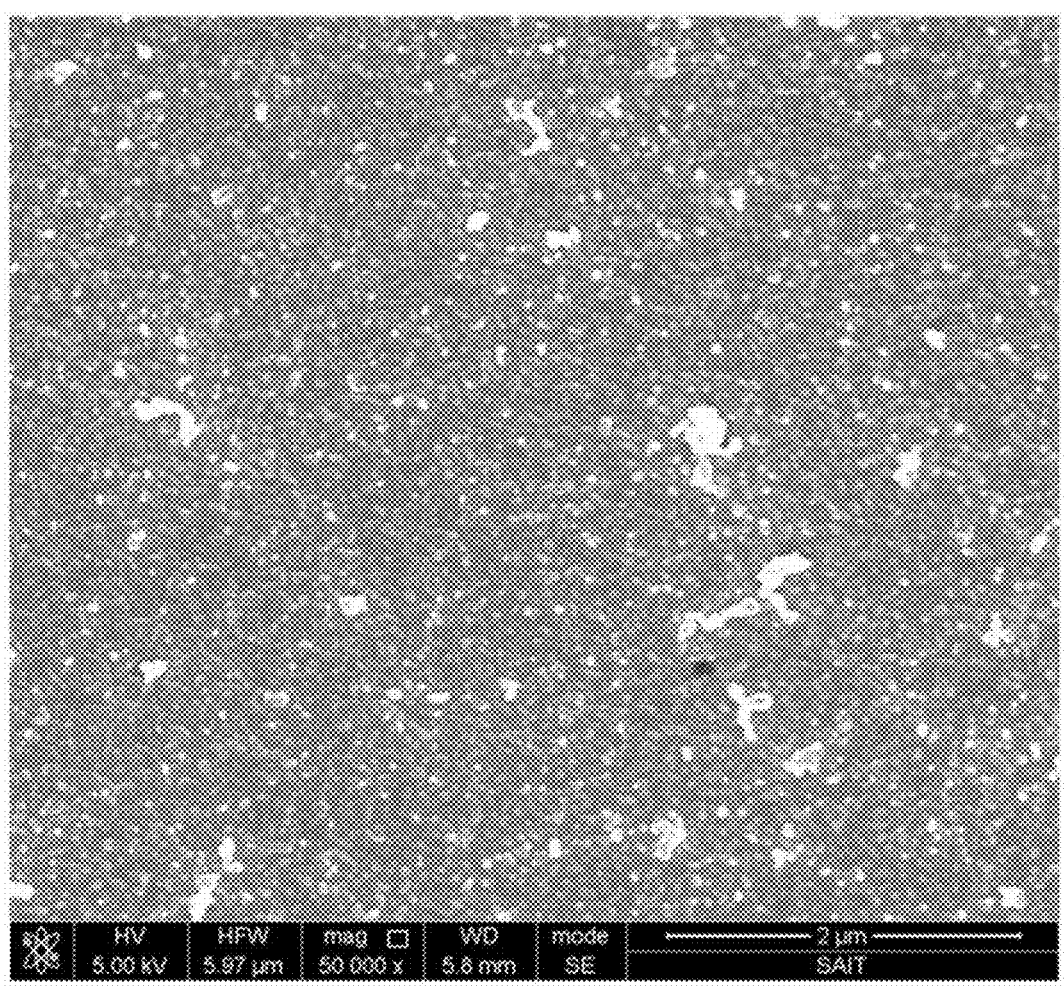
FIG. 10A and FIG. 10B are FE-SEM images of a surface and a cross-section of a composite membrane of Example 2, respectively.
Figure 10B:
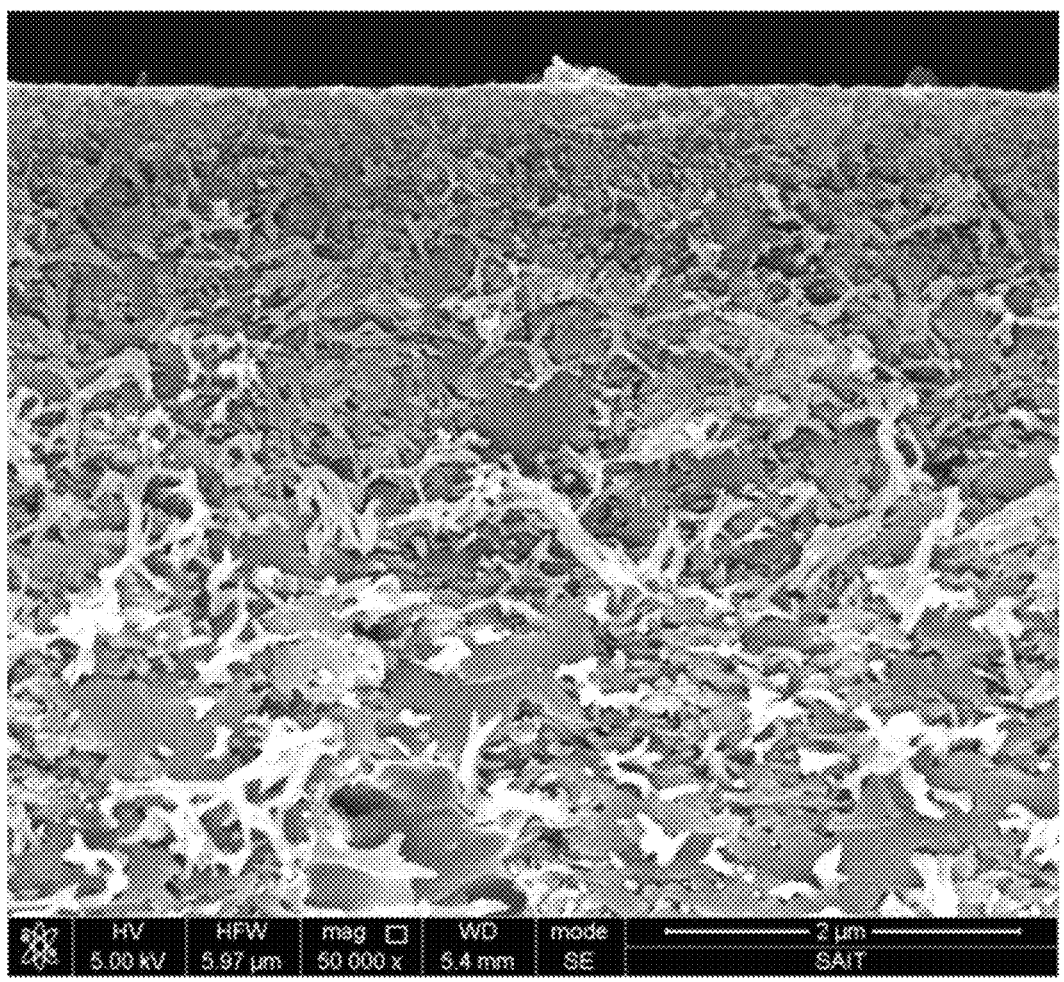
Figure 11A:
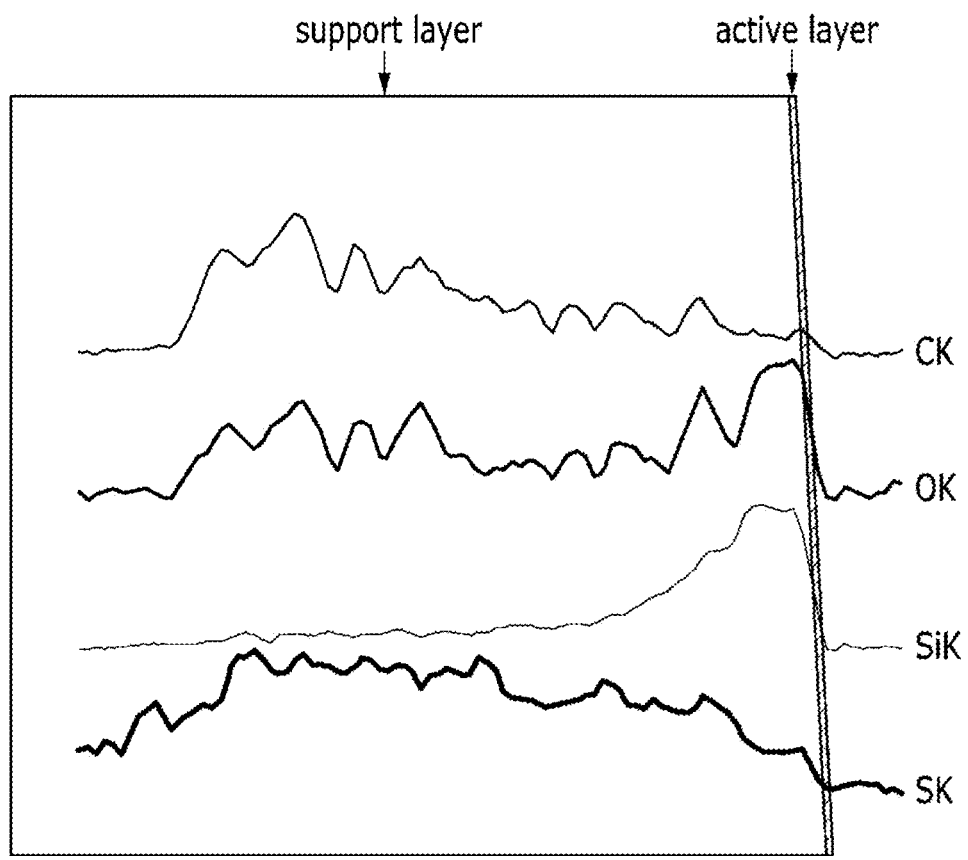
FIG. 11A and FIG. 11B show results of a SEM-EDX analysis of the composite membrane of Example 2.
Figure 11B:
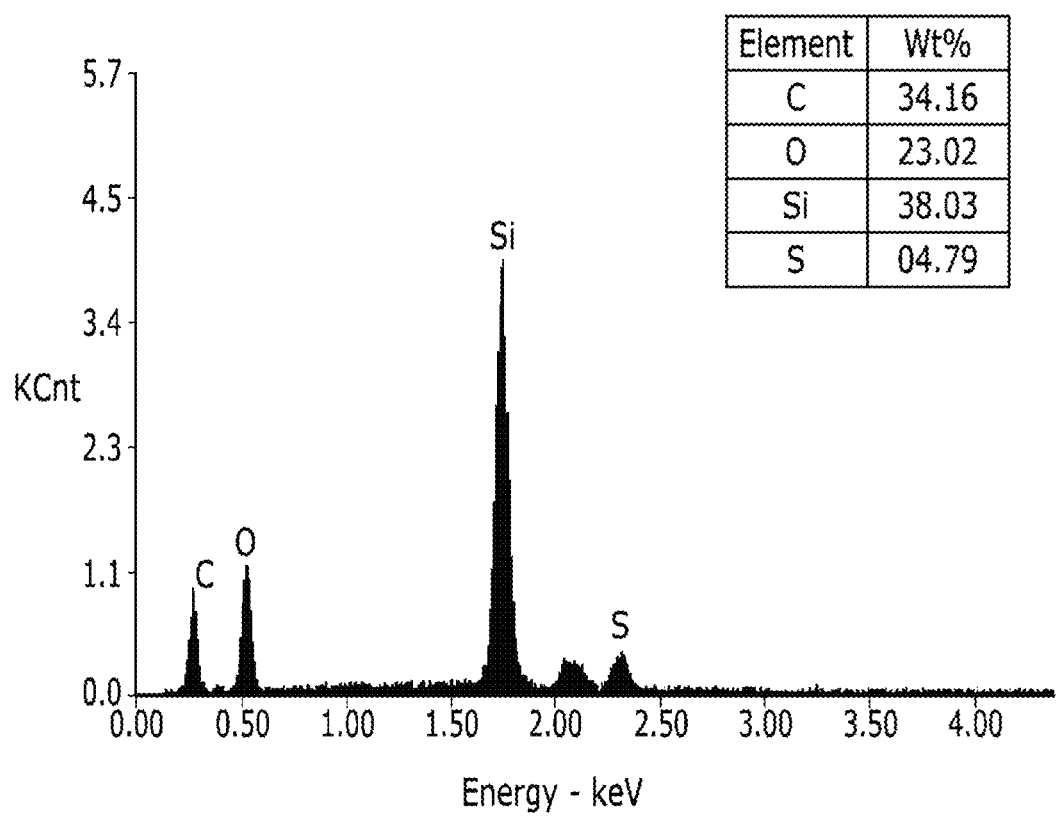

An analysis using a field effect scanning electron microscope manufactured by Hitachi Co., Ltd., (model name: FE-SEM S-4500) is made for the surface and the cross-section of the composite membrane thus prepared, and the results are shown in FIG. 10A and FIG. 10B. A scanning electron microscope—electron dispersive X-ray spectroscopy analysis is made for the composite membrane thus prepared using FE-SEM S-4500 of Hitachi Co., Ltd., and the results are schematically shown in FIGS. 11A and 11B. The results confirm that the composite membrane of Example 2 has a high silica content and the silica is distributed in such a concentration gradient that it has a maximum concentration near the interface between the support layer and the active layer.

Example 3

Polysulfone (Solvay, Udel p-3500, number average molecular weight: 80,000) is completely dissolved in DMF to produce a solution having a concentration of 13 wt %. The solution thus prepared is cooled to room temperature and deareated under a reduced pressure to obtain a casting solution. Polyester nonwoven fabric (manufactured by Hirose, product name: 05TH-12S, 17 μm) is immersed in the DMF solution, removed therefrom, and fixed on a glass plate, and the extra amount of DMF is removed using a rubber roll. Using a casting knife having a thickness of 150 μm, the casting solution is spread over the nonwoven fabric, which is then immersed in pure water for a predetermined time and removed therefrom and separated from the glass plate. The porous structure including a polymer thus obtained (hereinafter, referred to as the porous polymer structure) is washed with flowing water and the organic solvent is removed, and the structure is dried at room temperature for 24 hours.

17.5 g of m-phenylenediamine (MPD) is dissolved in 500 mL of distilled water to prepare a MPD solution and stored in the dark room. The porous polysulfone structure including silica is dipped into the MPD solution and extra amount of the solution is removed with a rubber roll. Then, the structure including the MPD solution is brought into contact with a solution prepared by dissolving 0.6 g of trimesoyl chloride (TMC) in 500 mL of i-sol E solvent to conduct interface polymerization, and the structure prepared therefrom is washed with 100 mL of n-hexane and dried again to prepare a membrane having a polyamide thin film.

A mixed solution including 7.68 g of ethanol, 11.57 g of tetraethoxysilane (TEOS), and 1 ml of a 2.8 M HCl aqueous solution is refluxed at 60° C. for 90 minutes. A solution including 15 g of ethanol, 4 ml of a 55 mM HCl aqueous solution, and 1.52 g of cetyltriethylammonium bromide (CTAB) is added to the refluxed solution containing TEOS, and the resulting solution is refluxed again for another 30 minutes. Then, the solution is cooled to room temperature to produce a TEOS colloidal solution.

About 9 to 10 mL of TEOS colloidal solution is uniformly added on the opposite surface of the membrane to the polyamide thin film and allowed to infiltrate into the structure using gravity. If desired, the membrane is made to stand upright to remove an extra amount of the solution. The membrane holding the colloidal solution therein is dried in a dark room (substantially without light) at room temperature and under a normal pressure for at least 12 hours to prepare a polyamide-polysulfone composite membrane including silica.

Figure 12A:
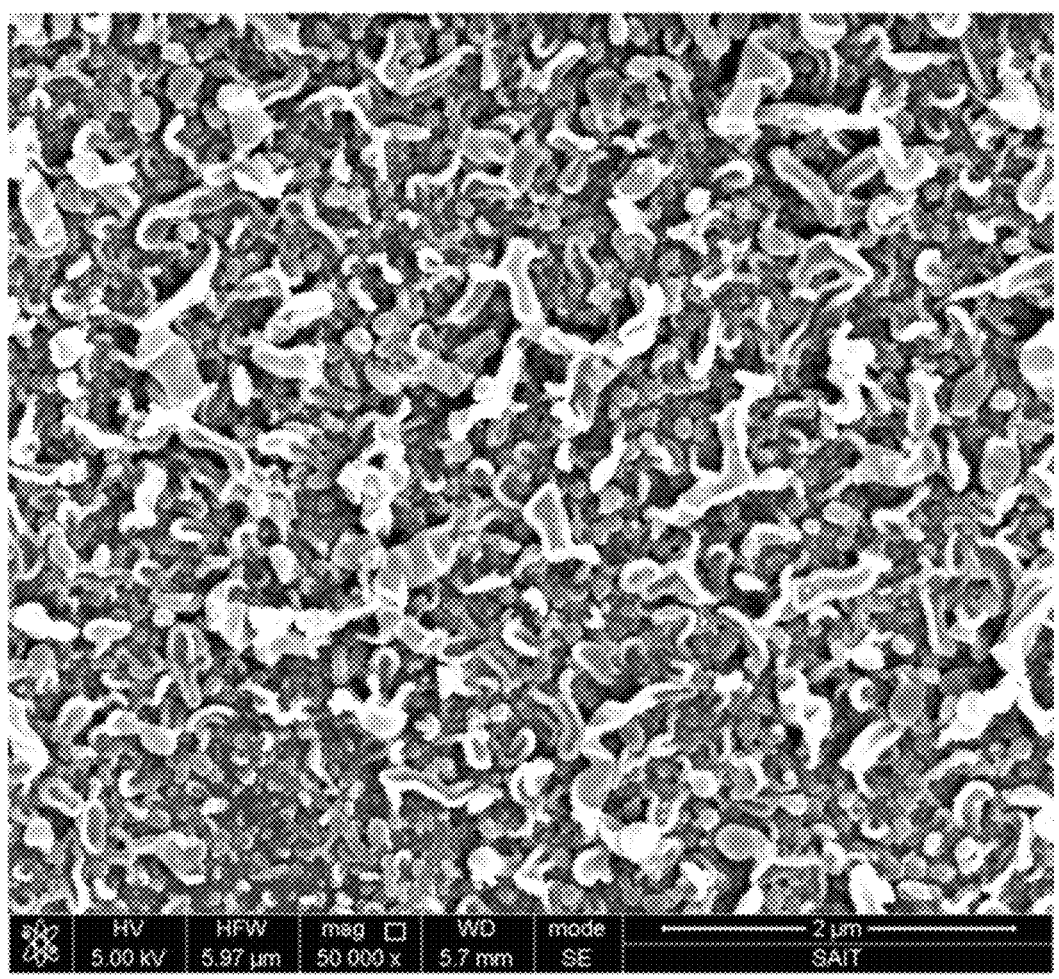
FIG. 12A and FIG. 12B are FE-SEM images of a surface and a cross-section of a composite membrane of Example 3, respectively.
Figure 12B:
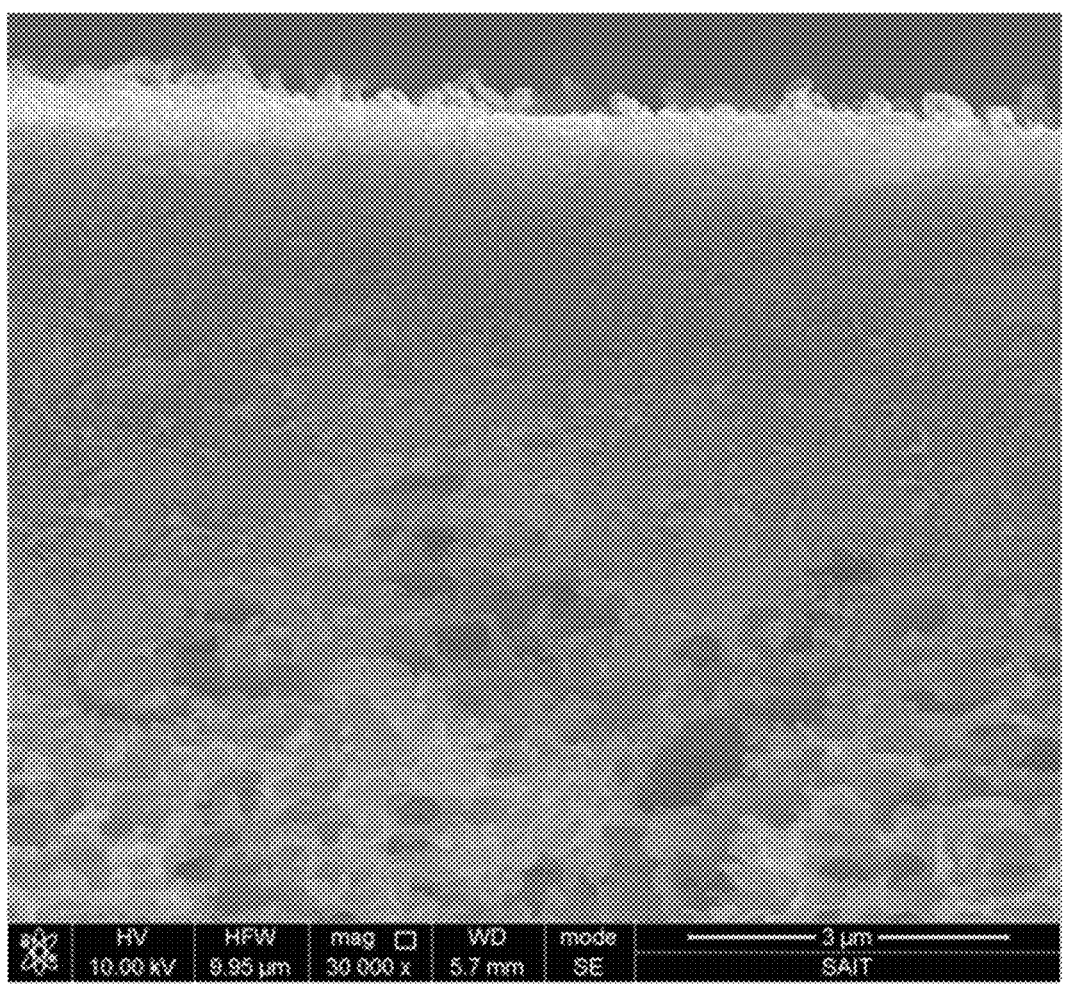
Figure 13A:
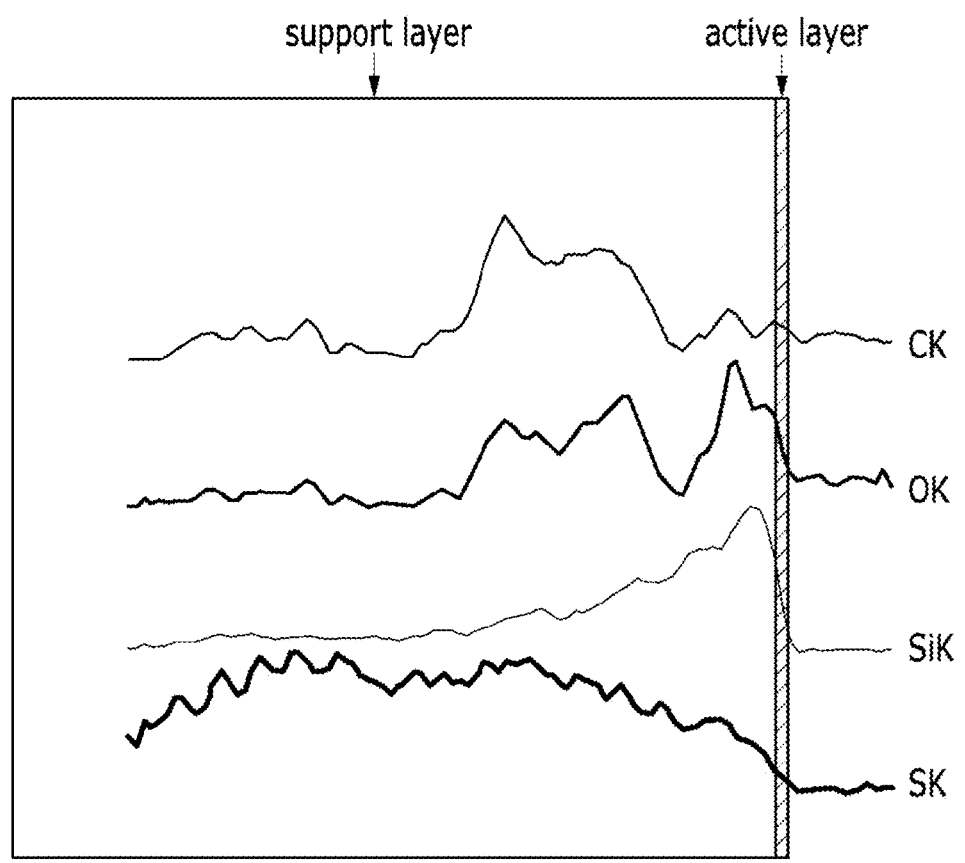
FIG. 13A and FIG. 13B show results of a SEM-EDX analysis of the composite membrane of Example 3.
Figure 13B:
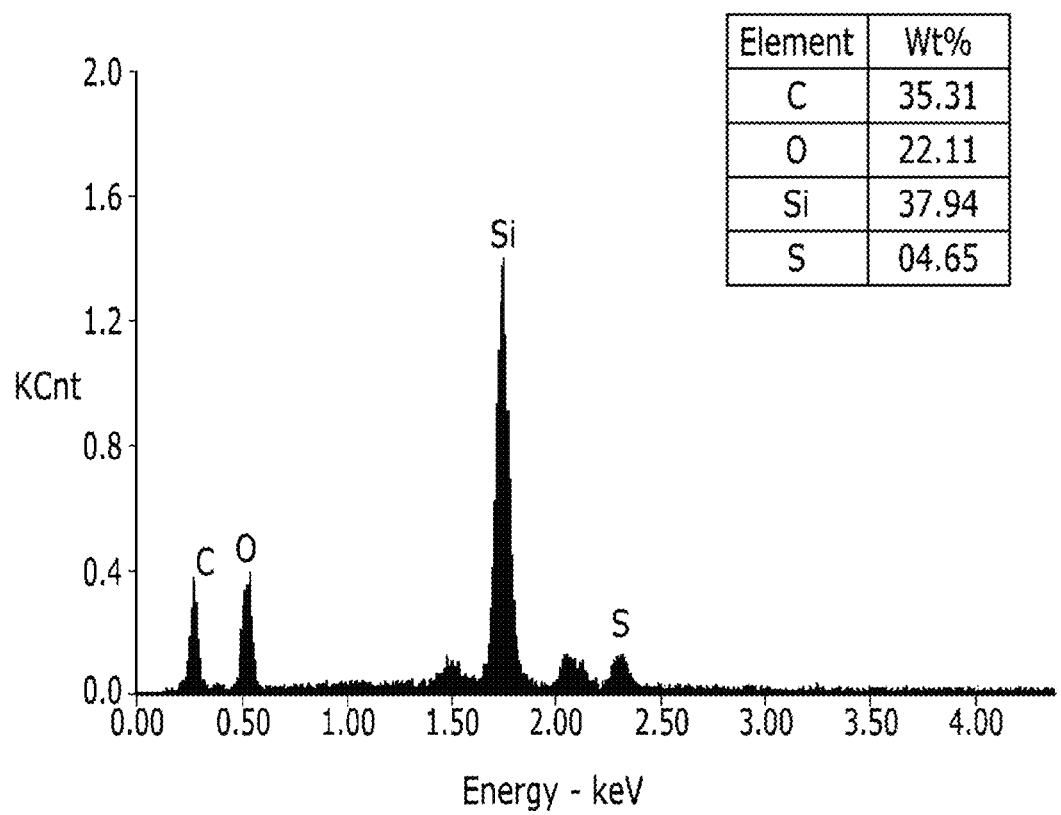

An analysis using a field effect scanning electron microscope manufactured by Hitachi Co., Ltd., (model name: FE-SEM S-4500) is made for the surface and the cross-section of the composite membrane thus prepared, and the results are shown in FIG. 12A and FIG. 12B. A scanning electron microscope—electron dispersive X-ray spectroscopy analysis is made for the composite membrane thus prepared using FE-SEM S-4500 of Hitachi Co., Ltd., and the results are schematically shown in FIG. 13A and FIG. 13B. The results confirm that the composite membrane of Example 3 has a high silica content, and the silica is distributed in such a concentration gradient that it has a maximum concentration near the interface between the support layer and the active layer.

Example 4

A mixed solution consisting of 1.05 ml of $H_2O$, 0.2 mL of 11.5 M HCl, and 16 ml of EtOH is prepared, 1 g of 3-aminopropyl-methyl-diethoxy silane is added to 15 mL of the ethanol mixed solution and stirred to produce a 3-aminopropyl-methyl-diethoxy silane solution, which is then uniformly added on a surface of the polyamide-polysulfone composite membrane including silica obtained in Example 3 and allowed to infiltrate into the structure using gravity. The resulting structure is dried at a temperature of 70° C. for 20 minutes to produce the polyamide-polysulfone composite membrane including silica and organosilica.

Figure 14A:
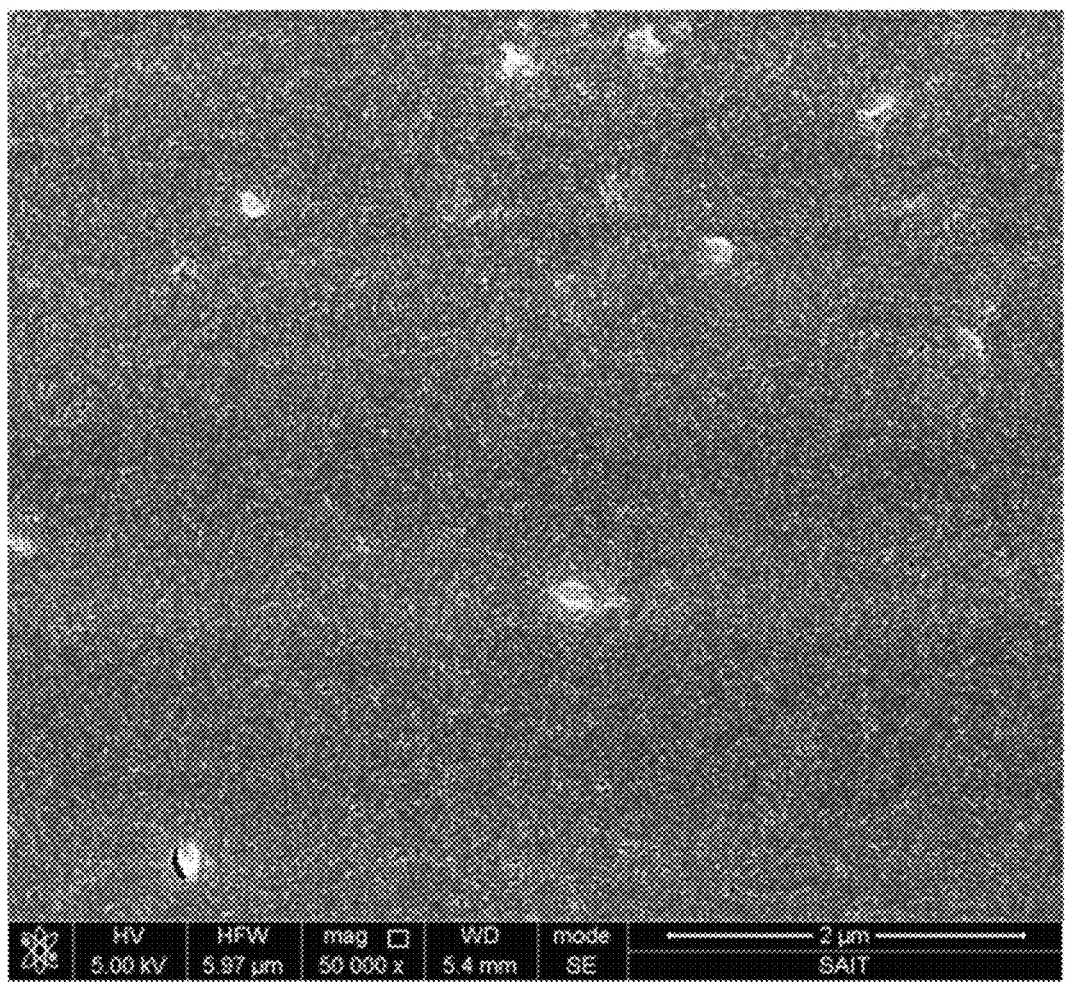
FIG. 14A and FIG. 14B are FE-SEM images of a surface and a cross-section of a composite membrane of Example 4, respectively.
Figure 14B:
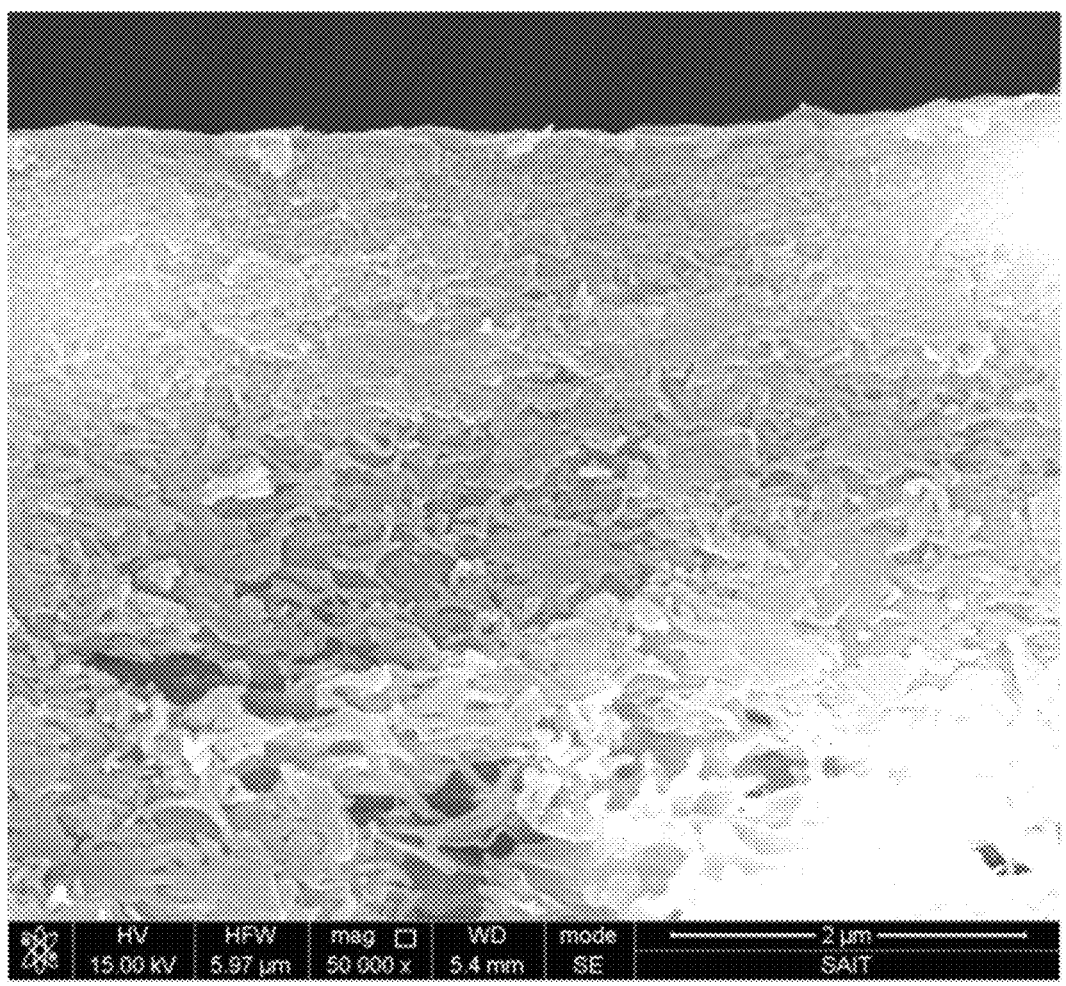
Figure 15A:
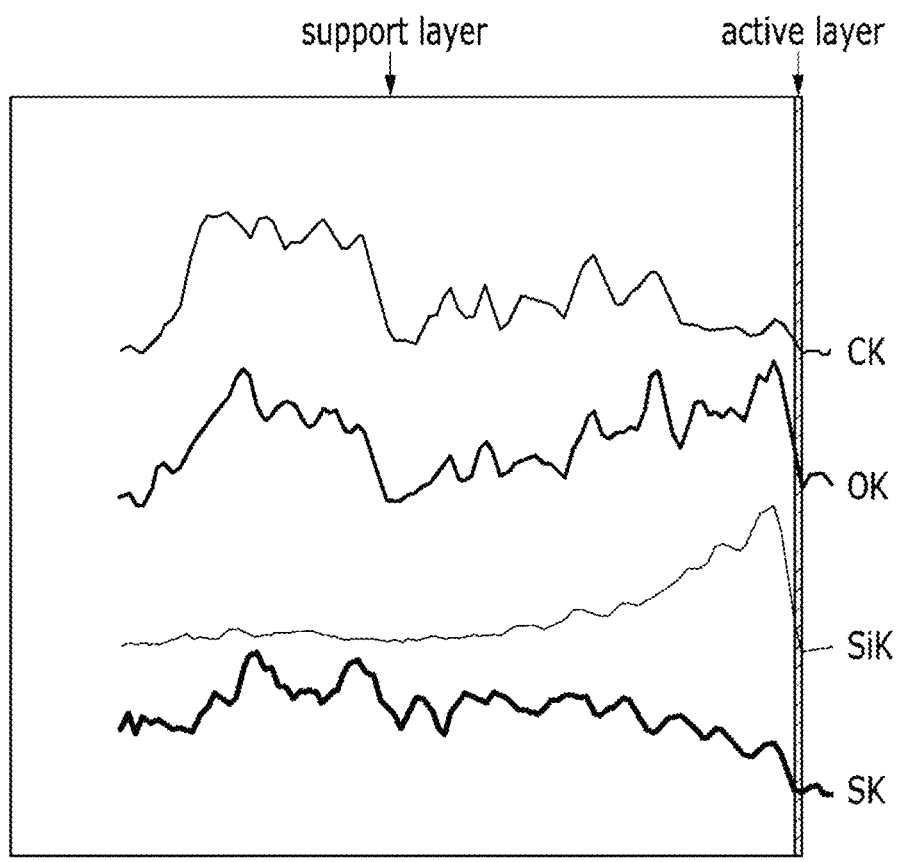
FIG. 15A and FIG. 15B show results of a SEM-EDX analysis of the composite membrane of Example 4.
Figure 15B:
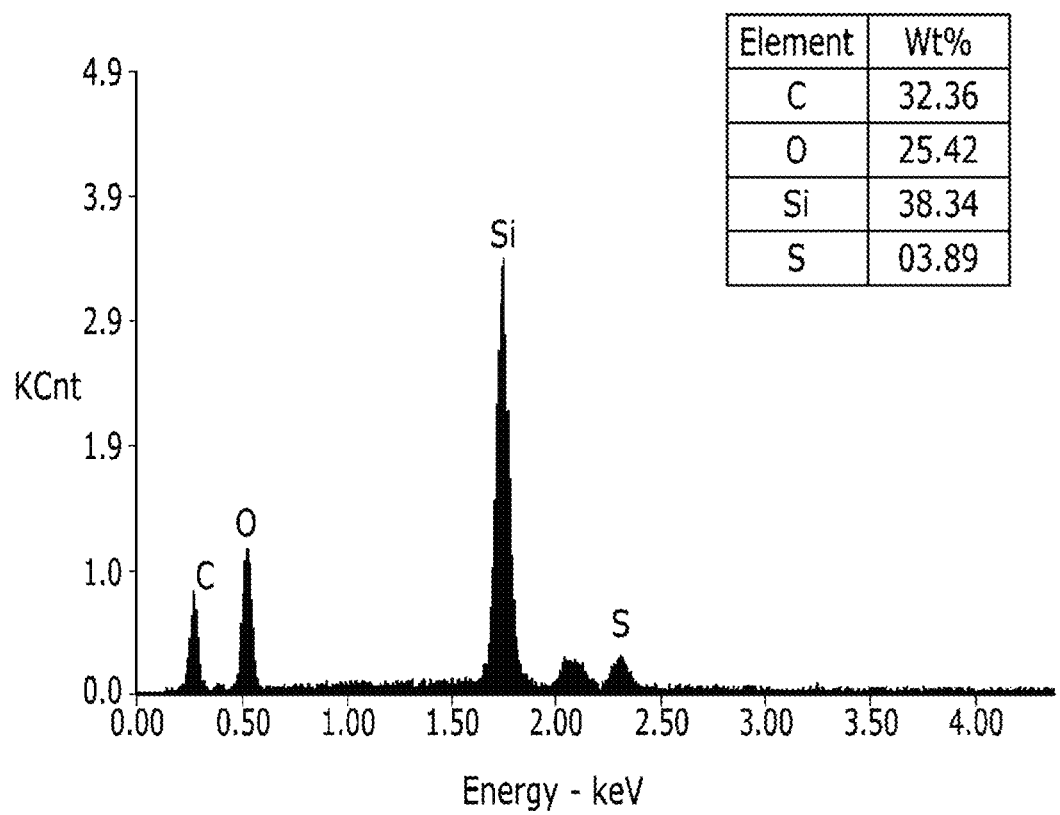

An analysis using a field effect scanning electron microscope manufactured by Hitachi Co., Ltd., (model name: FE-SEM S-4500) is made for the surface and the cross-section of the composite membrane thus prepared, and the results are shown in FIGS. 14A and 14B. A scanning electron microscope—electron dispersive X-ray spectroscopy analysis is made for the composite membrane thus prepared using FE-SEM S-4500 of Hitachi Co., Ltd., and the results are schematically shown in FIGS. 15A and 15B. The results confirm that the composite membrane of Example 4 has a greatly increased silica content, and the silica is distributed in such a concentration gradient that it has a maximum concentration near the interface between the support layer and the active layer.

Example 5

A polyamide-polysulfone composite membrane including titania is obtained in the same manner as set forth in Example 3, except that a titanium isopropoxide colloidal solution prepared as below is used instead of the TEOS colloidal solution.

11.2 mL of titanium isopropoxide is dissolved in ethanol and is mixed with a mixed solution of ethanol and water. Diethanol amine is added to the resulting solution to obtain a colloidal solution (mole ratio of titanium tetraisopropoxide:ethanol:water:diethanol amine=4:140:4:1). If desired, an appropriate amount of CTAB may be added thereto.

Example 6

A polyamide-polysulfone composite membrane including zirconia is obtained in the same manner as set forth in Example 3, except that a zirconium n-propoxide colloidal solution prepared as below is used instead of the TEOS colloidal solution.

Zirconium n-propoxide is mixed with n-propanol and nitric acid, and the resulting mixture is mixed again with a mixed solution of n-propanol and water (mole ratio of zirconium n-propoxide:n-propanol:water:nitric acid=4:140:4:1).

Evaluation of Forward Osmosis Performance for the Composite Membrane Thus Prepared The semi-permeable membranes prepared by Comparative Examples 1 and 2 and Examples 1 to 4 are used to produce a forward osmosis apparatus of a co-current cross-flow type. Distilled water (as a feed solution) and a draw solution (draw solute: NaCl, concentration: 1 M) are filled in the apparatus on either side of the semi-permeable membrane, respectively, such that the active layer side faces the feed solution. The feed solution and the draw solution flow at a rate of 1 L/min, and the water flux is calculated from the volume changes of each solution for 1 hour after 30 minutes from the start of the flows of the feed solution and the draw solution. Reverse solute flux from the draw solution to the feed solution through the membrane is determined by measuring conductivity.

Figure 16:
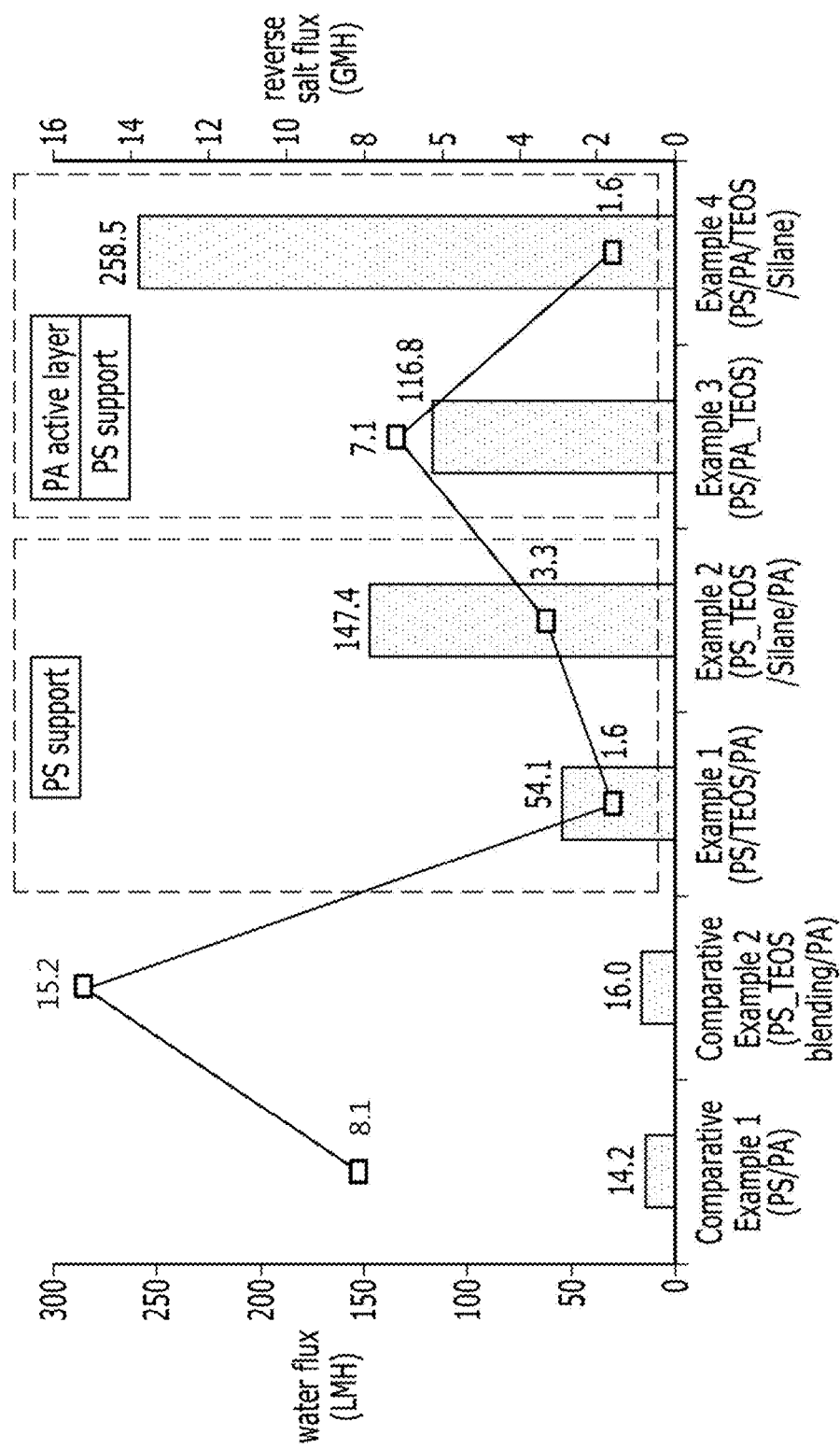
FIG. 16 shows the results of evaluating water flux and reverse solute flux for each of the composite membranes produced by the examples and comparative examples.

The results are shown in FIG. 16. The results of FIG. 16 confirm that the semi-permeable membrane of Examples 1 to 4 have high water flux and low reverse salt flux in comparison with the semi-permeable membrane of Comparative Examples 1 and 2. In the semi-permeable membrane of Examples 1 to 4, the support layer including polysulfone includes a lot of silica or organosilica being prepared by the hydrolysis and the condensation polymerization of tetraethoxy silane (TEOS) near the interface between the active layer and the support layer. Without wishing to be bound by any theory, the aforementioned structure of the semi-permeable membrane allows the same to have enhanced hydrophilicity, making it possible to reduce internal concentration polarization in a forward osmosis process and to greatly increase water flux. In addition, a relatively large amount of silica possibly including pores is present near the interface between the active layer of polyamide and the support layer including polysulfone to form a dense structure, significantly decreasing the reverse salt flux.

The membrane having the aforementioned structure may exhibit high salt removal performance and greatly increased water flux at the same time when it is used as a forward osmosis composite membrane or a reverse osmosis composite membrane. In particular, when the membrane is prepared, inorganic particles may be introduced with relative ease and its structure may be readily controlled, and thereby a larger area membrane is produced more conveniently.

While various examples are disclosed herein, it is to be understood that the present disclosure is not limited to the disclosed embodiments, but, on the contrary, is intended to cover various modifications and equivalent arrangements included within the spirit and scope of the appended claims.

What is claimed is:

1. A semi-permeable membrane comprising:
    a support layer including a first surface and an opposing second surface; the support layer having a porous structure including a polymer and an amount of at least one metal oxide or metalloid oxide in the porous structure of the support layer; the at least one metal oxide or metalloid oxide including at least one of silicon, titanium, zirconium, and aluminum; the amount of the at least one metal oxide or metalloid oxide having a concentration gradient that increases with decreasing distance moving towards the first surface of the support layer and moving away from the second surface of the support layer; and an amount of the metal or the metalloid element of the at least one metal oxide or metalloid oxide in the first surface of the support layer being greater than or equal to about 10% based on a total weight of all elements constituting the polymer and the metal oxide or metalloid oxide in the first surface as measured by a scanning electron microscope—electron dispersive X-ray spectroscopy analysis of the semi-permeable membrane; and
    an active layer in contact with the first surface of the support layer.

2. The semi-permeable membrane of claim 1, wherein the polymer is selected from a polysulfone, a polyethersulfone, a polyphenylsulfone, a polycarbonate, a polyethylene oxide, a polyimide, a polyetherimide, a polyetherether ketone, a polypropylene, a polymethyl chloride, a polyvinylidene fluoride, acrylonitrile copolymer, cellulose triacetate, cellulose acetate, cellulose ester, a polystyrene, a derivative thereof, and a combination thereof.

3. The semi-permeable membrane of claim 1, wherein the porous structure comprises a fiber assembly.

4. The semi-permeable membrane of claim 1, wherein the at least one metal oxide or metalloid oxide comprises silica, an organosilica having a substituted or unsubstituted aminoalkyl group, an organosilica having a glycidoxy alkyl group, titania ($TiO_2$), zirconia ($ZrO_2$), alumina, zeolite, or a combination thereof.

5. The semi-permeable membrane of claim 1, wherein at least about 90% of a total amount of the at least one metal oxide or metalloid oxide is present within 50% of a total thickness of the support layer from the first surface.

6. The semi-permeable membrane of claim 1, wherein the active layer comprises a polymer selected from polyamide, cellulose triacetate, cellulose acetate, cellulose ester, polyimide, polyurethane, polybenzimidazole, a derivative thereof, and a combination thereof.

7. The semi-permeable membrane of claim 1, wherein the amount of the metal or the metalloid element of the at least one metal oxide or metalloid oxide in the first surface is greater than or equal to about 20 wt % based on the total weight of all elements constituting the polymer and the metal oxide or metalloid oxide in the first surface as measured by the scanning electron microscope—electron dispersive X-ray spectroscopy analysis of the semi-permeable membrane.

8. A method of producing the semi-permeable membrane of claim 1, comprising:
    obtaining the support layer including the porous structure having the polymer; the support layer including the first surface and the opposing second surface,
    forming the active layer to be in contact with the first surface of the support layer;
    obtaining a colloidal solution including a solvent and at least one selected from a precursor of the metal or metalloid oxide, a hydrolyzed product of the precursor, and a condensation-polymerization product of the precursor; and
    applying the colloidal solution to the support layer to allow the colloidal solution to be in contact with the porous structure and drying the same to form the amount of the at least one metal oxide or metalloid oxide in the porous structure in an in-situ manner via a sol-gel reaction.

9. The method of claim 8, wherein the precursor of the at least one metal oxide or metalloid oxide is a compound represented by Chemical Formula 1-a or Chemical Formula 1-b:

$$(R^1)_x\text{-}A\text{-}(R^2)_{n-x} \quad \text{Chemical Formula 1-a}$$

wherein A is Si, Ti, Zr, or Al, $R^1$ are the same or different and are each independently hydrogen, a substituted or unsubstituted, straight or branched C1 to C10 alkyl group, a substituted or unsubstituted, straight or branched C2 to C10 alkenyl group, a substituted or unsubstituted, straight or branched C1 to C10 amine group, or a glycidyl ether group, $R^2$ are the same or different and are each independently a hydroxyl group, —Cl, or a straight or branched C1 to C10 alkoxy group, n is 3 or 4, x is 0, 1, or 2, and n−x is greater than or equal to about 2;

$$(R^3)_y(R^4)_{3-y}\text{-}A\text{-}L\text{-}A\text{-}(R^5)_z(R^6)_{3-z} \quad \text{Chemical Formula 1-b}$$

wherein A is Si or Ti, L is a direct bond, —O—, or a C1 to C10 alkylene group, $R^3$ are the same or different and are each independently hydrogen or a substituted or unsubstituted straight or branched C1 to C10 alkyl group, $R^4$ are the same or different and are each independently a hydroxyl group, —Cl, or a C1 to C10 alkoxy group, $R^5$ are the same or different and are each independently hydrogen or a substituted or unsubstituted straight or branched C1 to C10 alkyl group, $R^6$ are the same or different and are each independently a hydroxyl group, —Cl, or a C1 to C10 alkoxy group, y is 0, 1, or 2, and z is 0, 1, or 2.

10. The method of claim 9, wherein the precursor of the at least one metal oxide or metalloid oxide comprises tetramethoxysilane, tetraethoxysilane, triethoxyethylsilane, 1,2-bis(triethoxy silyl)ethane, titanium tetraisopropoxide (TTIP), zirconium n-propoxide, aluminum isopropoxide, or a combination thereof.

11. The method of claim 8, further comprising:
preparing a second solution including a solvent and at least one selected from a compound represented by Chemical Formula 2, a hydrolyzed product of the compound, and a condensation-polymerized product of the compound:

$$(X)_x\text{-}A\text{-}(R^7)_{n-x} \quad \text{[Chemical Formula 2]}$$

wherein A is Si, Ti, Zr, or Al, $R^7$ are the same or different and are each independently a hydroxyl group, —Cl, or a C1 to C10 alkoxy group, n is 3 or 4, x is 1, 2, or 3, n−x is greater than or equal to 1, X are the same or different and are each independently hydrogen, a substituted or unsubstituted C1 to C10 alkyl, a substituted or unsubstituted C2 to C10 alkenyl, a substituted or unsubstituted C1 to C10 aminoalkyl, or a glycidoxy alkyl group, provided that at least one of X is a substituted or unsubstituted C1 to C10 aminoalkyl or a glycidoxy alkyl group; and applying the second solution to the support layer to allow the second solution to be in contact with the porous structure containing the metal oxide or the metalloid oxide formed therein.

12. The method of claim 11, wherein the compound represented by Chemical Formula 2 comprises aminoethyl aminopropyl trimethoxy silane, aminopropyl trimethoxy silane, glycidoxy propyl trimethoxy silane, or a combination thereof.

13. The method of claim 8, wherein the solvent comprises a C1 to C10 alcohol or a combination thereof.

14. The method of claim 8, wherein the obtaining of the support layer comprises contacting a fiber assembly with a solution containing the polymer and removing the solvent therefrom.

15. The method of claim 8, wherein the forming of the active layer is carried out prior to or after formation of the metal oxide or the metalloid oxide.

16. The method of claim 8, wherein the polymer is selected from a polysulfone, a polyethersulfone, a poly phenyl sulfone, a polycarbonate, a polyethylene oxide, a polyimide, a polyetherimide, a polyetherether ketone, a polypropylene, a polymethyl chloride, a polyvinylidene fluoride, acrylonitrile copolymer, cellulose triacetate, cellulose acetate, cellulose ester, a polystyrene, a derivative thereof, and a combination thereof.

17. The method of claim 8, wherein the active layer comprises at least one polymer selected from polyamide, cellulose triacetate, cellulose acetate, cellulose ester, polyimide, polyurethane, polybenzimidazole, a derivative thereof, and a combination thereof.

* * * * *